United States Patent
Liu et al.

(10) Patent No.: US 10,986,668 B2
(45) Date of Patent: Apr. 20, 2021

(54) TERMINAL APPARATUS, BASE STATION APPARATUS, COMMUNICATION METHOD, AND INTEGRATED CIRCUIT

(71) Applicants: Sharp Kabushiki Kaisha, Osaka (JP); FG Innovation Company Limited, New Territories (HK)

(72) Inventors: Liqing Liu, Sakai (JP); Shoichi Suzuki, Sakai (JP); Tomoki Yoshimura, Sakai (JP); Wataru Ouchi, Sakai (JP); Kimihiko Imamura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/348,894

(22) PCT Filed: Nov. 8, 2017

(86) PCT No.: PCT/JP2017/040220
§ 371 (c)(1),
(2) Date: May 10, 2019

(87) PCT Pub. No.: WO2018/088422
PCT Pub. Date: May 17, 2018

(65) Prior Publication Data
US 2019/0281636 A1 Sep. 12, 2019

(30) Foreign Application Priority Data
Nov. 11, 2016 (JP) .............................. JP2016-220655

(51) Int. Cl.
*H04W 4/00* (2018.01)
*H04W 74/08* (2009.01)
(Continued)

(52) U.S. Cl.
CPC ....... *H04W 74/0833* (2013.01); *H04W 16/14* (2013.01); *H04W 72/04* (2013.01);
(Continued)

(58) Field of Classification Search
CPC .............. H04W 72/042; H04W 76/27; H04W 72/0453; H04W 72/0446; H04W 74/0833;
(Continued)

(56) References Cited

U.S. PATENT DOCUMENTS

| 8,363,671 B2 * | 1/2013 | Korhonen | ........... H04W 74/006 370/437 |
| 2015/0049712 A1 * | 2/2015 | Chen | ..................... H04W 72/04 370/329 |

(Continued)

FOREIGN PATENT DOCUMENTS

| WO | 2009/116407 A1 | 9/2009 |
| WO | 2016/072215 A1 | 5/2016 |

(Continued)

OTHER PUBLICATIONS

Official Communication issued in International Patent Application No. PCT/JP2017/040220, dated Dec. 5, 2017.
(Continued)

*Primary Examiner* — Atique Ahmed
(74) *Attorney, Agent, or Firm* — Keating & Bennett, LLP

(57) ABSTRACT

Provided is a terminal apparatus that performs an uplink LBT procedure, wherein one or more than one subframes are allocated for transmission of a message 3 in an LAA cell, and an LBT procedure for transmission of a random access preamble is initiated in a case where it is determined that a channel is busy in all of the one or more than one subframes.

4 Claims, 11 Drawing Sheets

(51) Int. Cl.
*H04W 76/27* (2018.01)
*H04W 72/04* (2009.01)
*H04W 72/08* (2009.01)
*H04W 72/14* (2009.01)
*H04W 16/14* (2009.01)
*H04W 88/02* (2009.01)

(52) U.S. Cl.
CPC ..... *H04W 72/0446* (2013.01); *H04W 72/085* (2013.01); *H04W 72/14* (2013.01); *H04W 74/08* (2013.01); *H04W 76/27* (2018.02); *H04W 88/02* (2013.01)

(58) Field of Classification Search
CPC ... H04W 16/14; H04W 72/04; H04W 72/085; H04W 72/14; H04W 74/08; H04W 88/02; H04L 5/0053; H04L 5/0007; H04L 1/1812
See application file for complete search history.

(56) References Cited

U.S. PATENT DOCUMENTS

| | | | |
|---|---|---|---|
| 2016/0073344 A1* | 3/2016 | Vutukuri | H04W 72/14 370/252 |
| 2016/0088660 A1* | 3/2016 | Liu | H04W 74/0841 370/252 |
| 2017/0273056 A1* | 9/2017 | Papasakellariou | H04W 52/143 |
| 2018/0124749 A1 | 5/2018 | Park et al. | |
| 2018/0241511 A1* | 8/2018 | Harada | H04W 72/04 |
| 2018/0279372 A1 | 9/2018 | Takeda et al. | |
| 2019/0053222 A1* | 2/2019 | Bhorkar | H04W 16/14 |

FOREIGN PATENT DOCUMENTS

| | | |
|---|---|---|
| WO | 2016/163709 A1 | 10/2016 |
| WO | 2017/076598 A1 | 5/2017 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.

"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361.

Ericsson et al., "New Work Item on enhanced LAA for LTE", 3GPP TSG RAN Meeting #70, RP-152272, Dec. 7-10, 2015, 8 pages.

Qualcomm Inc., "RACH Procedure for Enhanced LAA", 3GPP TSG-RAN2 Meeting #93bis, R2-162911, Apr. 12-16, 2016, 4 pages.

Samsung, "Discussion on random access procedure for eLAA", 3GPP TSG RAN WG1 Meeting #85, R1-164749, May 23-27, 2016, 6 pages.

* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-220655 filed on Nov. 11, 2016 and submitted to Japan Patent Office, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In LTE, a base station apparatus is referred also to as an evolved NodeB (eNodeB), and a terminal apparatus is referred also to as a User Equipment (UE). LTE is a cellular communication system in which multiple areas are deployed in a cellular structure, with each of the multiple areas being covered by a base station apparatus. A single base station apparatus may manage a plurality of cells.

In LTE Release 13, carrier aggregation—a technology allowing a terminal apparatus to perform transmission and/or reception simultaneously in a plurality of serving cells (component carriers)—has been specified (NPLs 1, 2, and 3). In LTE Release 14, a certain type of carrier aggregation has been studied which uses Licensed Assisted Access (LAA) function enhancement and uplink component carrier in an unlicensed band (NPL 4). A random access using the uplink component carrier in an unlicensed band has also been studied. Particularly in the unlicensed band, the transmission of the message 3 may be performed inefficiently due to the influence of the LBT or the like.

CITATION LIST

Non Patent Literature

NPL 1: "3GPP TS 36.211 V13.1.0 (2016-03)", 29th Mar., 2016.
NPL 2: "3GPP TS 36.212 V13.1.0 (2016-03)", 29th Mar., 2016.
NPL 3: "3GPP TS 36.213 V13.1.1 (2016-03)", 31th Mar., 2016.
NPL 4: "New Work Item on enhanced LAA for LTE", RP-152272, Ericsson, Huawei, 3GPP TSG RAN Meeting #70, Sitges, Spain, 7th to 10th Dec., 2015.

SUMMARY OF INVENTION

Technical Problem

An aspect of the present invention provides: a terminal apparatus capable of performing efficient uplink transmission; a communication method used for the terminal apparatus; an integrated circuit to be implemented in the terminal apparatus; a base station apparatus capable of performing efficient reception of uplink transmission; a communication method used for the base station apparatus; and an integrated circuit to be implemented in the base station apparatus.

Solution to Problem (1) According to some aspects of the present invention, the following measures are provided. A first aspect of the present invention provides a terminal apparatus including: a channel measurement unit configured to perform an uplink LBT procedure; and a transmission processing unit configured to transmit a message 3 in an LAA cell. In the terminal apparatus, one or more than one subframes are allocated for transmission of the message 3, and the transmission processing unit initiates an LBT procedure for transmission of a random access preamble in a case where it is determined that a channel is busy in all of the one or more than one subframes.

(2) A second aspect of the present invention provides a base station apparatus for communicating with a terminal apparatus. The base station apparatus includes: a radio resource control unit configured to allocate a subframe to be used for transmitting a message 3; and a reception processing unit configured to receive the message 3 in an LAA cell. In the base station apparatus, one or more than one subframes are allocated for transmission of the message 3, and the reception processing unit receives a random access preamble transmission in a case where reception of the message 3 fails in all of the one or more than one subframes.

(3) A third aspect of the present invention provides a communication method to be used for a terminal apparatus. The communication method includes the steps of: performing an uplink LBT procedure; and transmitting a message 3 in an LAA cell. In the communication method, one or more than one subframes are allocated for transmission of the message 3, and a transmission processing unit initiates an LBT procedure for transmission of a random access preamble in a case where it is determined that a channel is busy in all of the one or more than one subframes.

(4) A fourth aspect of the present invention provides a communication method to be used for a base station apparatus for communicating with a terminal apparatus. The communication method includes the steps of: allocating a subframe to be used for transmitting a message 3; and receiving the message 3 in an LAA cell. In the communication method, one or more than one subframes are allocated for transmission of the message 3, and a reception processing unit receives transmission of a random access preamble in a case where reception of the message 3 fails in all of the one or more than one subframes.

(5) A fifth aspect of the present invention provides an integrated circuit to be implemented in a terminal apparatus. The integrated circuit includes: a channel measurement circuit configured to perform an uplink LBT procedure; and a transmission processing circuit configured to transmit a message 3 in an LAA cell. In the integrated circuit, one or more than one subframes are allocated for transmission of the message 3, and the transmission processing circuit initiates an LBT procedure for transmission of a random access preamble in a case where it is determined that a channel is busy in all of the one or more than one subframes.

(6) A sixth aspect of the present invention provides an integrated circuit to be implemented in a base station apparatus. The integrated circuit includes: a radio resource control circuit configured to allocate a subframe to be used for transmitting a message 3; and a reception processing circuit configured to receive the message 3 in an LAA cell. In the integrated circuit, one or more than one subframes are allocated for transmission of the message 3, and the reception processing circuit receives a random access preamble transmission in a case where reception of the message 3 fails in all of the one or more than one subframes.

Advantageous Effects of Invention

According to an aspect of the present invention, the terminal apparatus can perform the uplink transmission efficiently. In addition, the base station apparatus can receive the uplink transmission efficiently.

DESCRIPTION OF EMBODIMENTS

Embodiments of the present invention will be described below.

Figure 1:
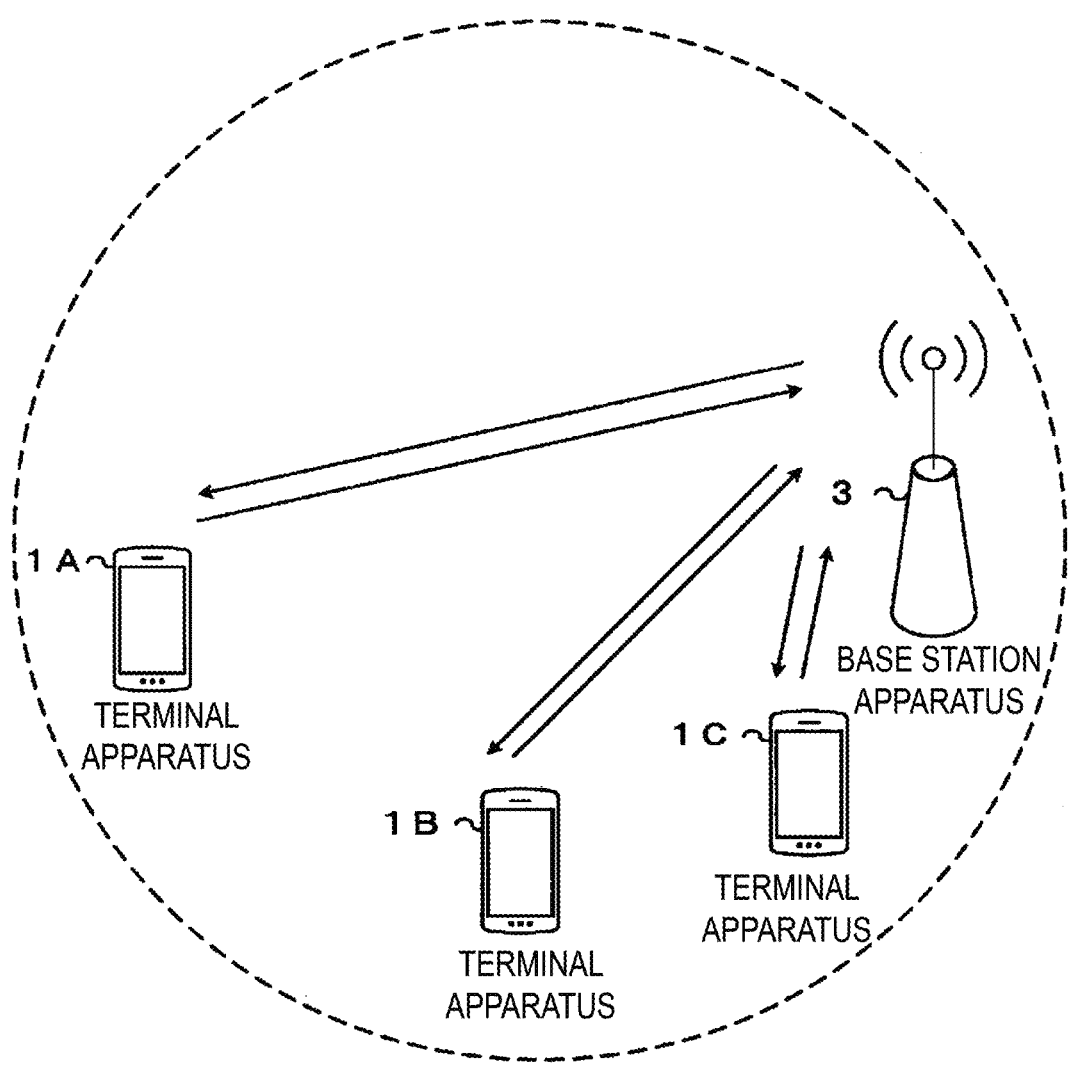
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

The base station apparatus 3 manages a cell, which corresponds to an area where terminal apparatuses 1 can communicate with the base station apparatus 3, for each frequency. A single base station apparatus 3 may manage multiple cells. Cells are classified into multiple types of cells depending on the size of the area (cell size) that allows for communication with terminal apparatuses 1. For example, cells are classified into macro cells and small cells. Moreover, small cells are classified into femto cells, pico cells, and nano cells depending on the size of the area. In a case that a terminal apparatus 1 can communicate with a certain base station apparatus 3, the cell configured so as to be used for the communication with the terminal apparatus 1 is referred to as "Serving cell" while the other cells not used for the communication are referred to as "Neighboring cell", among the cells of the base station apparatus 3.

Hereinafter, carrier aggregation will be described.

According to the present embodiment, a plurality of Serving cells are configured for the terminal apparatus 1. A technology in which the terminal apparatus 1 communicates via the plurality of Serving cells is referred to as cell aggregation or carrier aggregation. An aspect of the present invention may be applied to each of the plurality of Serving cells configured for the terminal apparatus 1. Furthermore, an aspect of the present invention may be applied to some of the plurality of Serving cells configured. Furthermore, an aspect of the present invention may be applied to each of the groups of the plurality of Serving cells configured. Furthermore, an aspect of the present invention may be applied to some of the groups of the plurality of Serving cells configured. The plurality of Serving cells includes at least one primary cell. The plurality of Serving cells may include one or more secondary cells. The plurality of Serving cells may include one or more Licensed Assisted Access (LAA) cells. The LAA cell is referred also to as the "LAA secondary cell."

The primary cell is a Serving cell in which an initial connection establishment procedure has been performed, a Serving cell in which a connection re-establishment procedure has been started, or a cell indicated as a primary cell in a handover procedure. The secondary cell and/or the LAA cell may be configured at a point of time when or after a Radio Resource Control (RRC) connection is established. The primary cell may be included in a licensed band. The LAA cell may be included in an unlicensed band. The secondary cell may be included in any of a licensed band and an unlicensed band. Note that the LAA cell may be configured as a primary cell. Alternatively, the LAA cell may be configured as a secondary cell.

A carrier corresponding to a Serving cell in the downlink is referred to as a downlink component carrier. A carrier corresponding to a Serving cell in the uplink is referred to as an uplink component carrier. The downlink component carrier and the uplink component carrier are collectively referred to as a component carrier.

The terminal apparatus 1 can perform simultaneous transmission and/or reception on a plurality of physical channels in a plurality of Serving cells (component carriers). A single physical channel is transmitted in a single Serving cell (component carrier) out of the plurality of Serving cells (component carriers).

A basic configuration (architecture) of dual connectivity will be described below. The following description is based on an exemplar case where the terminal apparatus 1 is connected simultaneously with a plurality of base station apparatuses 3. For example, one of the base station apparatuses 3 is a base station apparatus constituting a macro cell, and a different one of the base station apparatus 3 is a base station apparatus constituting a small cell. The terminal apparatus 1 connecting to the base station apparatuses 3 at the same time by using the plurality of cells belonging to the plurality of base station apparatuses 3 as described above is referred to as "dual connectivity." The cells belonging to the respective base station apparatuses 3 may be operated at the same frequency or different frequencies.

In dual connectivity, a base station apparatus 3 that acts as the mobility anchor of the core network is referred to as a "master base station apparatus (MeNB: Master eNB)." Moreover, a base station apparatus 3 that is not the master base station apparatus and that provides supplemental radio resources to the terminal apparatus 1 is referred to as "secondary base station apparatus (SeNB: Secondary eNB)." A group of Serving cells that is associated with the master base station apparatus may be referred to as "MasterCell Group (MCG)," and a group of Serving cells that is associated with the secondary base station apparatus may be referred to as "Secondary Cell Group (SCG)." Note that the cell groups may be Serving cell groups.

In dual connectivity, the primary cell belongs to the MCG. Moreover, in the SCG, the secondary cell corresponding to the primary cell is referred to as "Primary Secondary Cell (pSCell)." Note that the PSCell may be referred to as "special cell" or "Special Secondary Cell (Special SCell)." Some of the functions (for example, functions for transmitting and/or receiving a PUCCH) of the PCell (the base station apparatus constituting the PCell) may be supported by the Special SCell (the base station apparatus constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell by using a search space different from a Common Search Space (CSS) or a UE-specific Search Space (USS). For example, the search space different from the USS is a search space determined based on a value defined in the specification, a search space determined based on an RNTI different from the C-RNTI, a search space determined based on a value configured by the higher layer that is different from the RNTI, or the like. Moreover, the pSCell may constantly be in a starting state. Moreover, the pSCell is a cell capable of receiving the PUCCH. In the dual connectivity, the LAA cell may be configured as a primary cell that belongs to the MCG. Alternatively, in the dual connectivity, the LAA cell may be configured as a secondary cell that belongs to the MCG. Further alternatively, in the dual connectivity, the LAA cell may be configured as a Primary secondary cell that belongs to the SCG. Even further alternatively, in the dual connectivity, the LAA cell may be configured as a secondary cell that belongs to the SCG.

Note that the carrier aggregation is different from the dual connectivity in that a single one of the base station apparatuses 3 manages multiple cells and the frequencies of the individual cells are different from each other. In other words, the carrier aggregation is a technique for connecting the single terminal apparatus 1 and a single one of the base station apparatus 3 via a plurality of cells having different frequencies, while dual connectivity is a technique for connecting the single terminal apparatus 1 and the plurality of base station apparatuses 3 via a plurality of cells having the same frequency or different frequencies. In addition, the carrier aggregation may be applied to each of the MCG and the SCG.

The dual connectivity may be applied to the LAA cell.

Details of the LAA cell and those of the LBT will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). The LBT includes a procedure where before a certain base station apparatus 3 or a certain terminal apparatus 1 transmits a signal by using a frequency (a component carrier, a carrier, a cell, a channel, or a medium), the certain base station apparatus 3 or the certain terminal apparatus 1 measures (detects) interference power (an interference signal, receive power, a receive signal, noise power and a noise signal) or the like of the frequency to discern (detect, assume or determine) whether the frequency is in an idle state (a free state, a non-congested state, Absence or Clear) or a busy state (an occupied state, a congested state, Presence or Occupied). In a case where based on the LBT, it is discerned that the certain frequency is in the idle state, the certain base station apparatus 3 or the certain terminal apparatus 1 can transmit a signal at a prescribed timing of the frequency of the LAA cell. In a case where it is discerned that the frequency is in the busy state, the certain base station apparatus 3 or the certain terminal apparatus 1 does not transmit a signal at the prescribed timing of the frequency of the LAA cell. LBT enables control preventing the signal transmitted by a certain base station apparatus 3 or a certain terminal apparatus 1 from interfering with signals to be transmitted by other base stations and/or terminals including other communication systems and/or other LTE operators. Note that LBT performed by the base station apparatus 3 before a downlink transmission is referred to as downlink LBT and that LBT performed by the terminal apparatus 1 before an uplink transmission is referred to as uplink LBT. Furthermore, LBT performed by the terminal apparatus 1 for sidelink transmissions may be referred to as sidelink LBT. The LBT may be Clear Channel Assessment (CCA). The LBT may be channel sensing. The LBT may be referred also to as the "Channel access (carrier sense)."

In the LBT, whether a particular frequency is idle or busy may be determined based on whether the interference power at the particular frequency exceeds a certain threshold value or not. Alternatively, in the LBT, whether a particular frequency is idle or busy may be determined based on whether the receive power of a prescribed signal or channel at the particular frequency exceeds a certain threshold value or not. In addition, in the LBT, the threshold value may be determined in advance. Alternatively, in the LBT, the threshold value may be set from the base station or from another terminal apparatus. Further alternatively, in the LBT, the threshold value may be determined (set) based at least on another value (parameter) such as the transmit power (maximum transmit power). Further alternatively, in the LBT, whether a particular frequency is idle or busy may be determined based on whether a prescribed channel at the particular frequency has been decoded successfully or not.

The downlink LBT includes a procedure where the base station apparatus 3 performs one or more LBTs. The uplink LBT, on the other hand, includes a procedure where the terminal apparatus 1 performs one or more LBTs. The downlink LBT includes a procedure where the LBT procedure is started in a case where there is information that can be transmitted on the downlink (data, buffer, load, traffic). The uplink LBT, on the other hand, may include a procedure where the LBT procedure is started in a case where the base station apparatus 3 has issued an instruction to perform uplink transmission (i.e., in a case where an uplink grant has been received).

The uplink LBT procedure has at least two different types (LBT Types): Type 1 (channel access Type 1); and Type 2 (channel access Type 2). The uplink LBT procedure of Type 1 may include the LBT category 4. The uplink LBT procedure of Type 2 may include a 25-μs CCA (LBT category 2).

The uplink LBT procedure of Type 1 includes a procedure where in a case where the terminal apparatus 1 performs first sensing (a single CCA) and consequently determines that the channel is idle, then the terminal apparatus 1 performs the LBT a prescribed number (N) of times indicated by a counter.

Specifically, in the first sensing, the terminal apparatus 1 performs the channel sensing in a slot duration within a defer duration, and thus senses whether there is a different signal. In a case where the terminal apparatus 1 determines that the channel is idle as a result of the first sensing, the terminal apparatus 1 may perform the following processes.

(i) The terminal apparatus 1 generates randomly a counter value N based on a contention window value.

(ii) In a case where the counter value is not zero, the terminal apparatus 1 decrements the counter value N by 1 as "N=N−1."

(iii) The terminal apparatus 1 performs the LBT in a single slot duration, and thus determines whether the channel is idle or busy. In a case where the terminal apparatus 1 determines that the channel is idle, the process (iv) will be performed next. In a case where the terminal apparatus 1 determines that the channel is busy, the process (v) will be performed next.

(iv) In a case where the counter value N becomes zero, the terminal apparatus 1 may obtain the right to access the channel and may perform uplink transmission through the channel. In a case where the counter value N is not zero, the terminal apparatus 1 will return back to the process (ii).

(v) The terminal apparatus 1 performs the channel sensing in all the slot durations included in a single defer duration, and thus determines whether the channels are idle or busy.

In a case where in the process (v) the terminal apparatus 1 determines, based on the channel sensing, that the channels in all the slot durations included in the single defer duration are idle, the terminal apparatus 1 will performs the process (iv) next. In a case where the terminal apparatus 1 determines, based on the channel sensing, that the channel in at least one of the slot durations included in the single defer duration is busy, the terminal apparatus 1 will perform again the process (v).

Note that the slot duration $T_{s1}$ may range from 9 us to 9 μs+$T_s$. The defer duration $T_d$ is defined as $T_f+m_p \times T_{s1}$. For example, the $T_f$ may range from 16 μs to 16 μs+$T_s$. The value of $m_p$ is determined based on the channel access priority class. The channel access priority class may be notified of by the uplink grant. Alternatively, the channel access priority class may be notified of by the RRC signalling. Note that the $T_s$ is a basic time unit, specifically, 1/(15000×2048) sec.

In the uplink LBT procedure of Type 2, whether the channel is idle or busy is determined based on the LBT performed in at least one sensing interval. In a case where the terminal apparatus 1 determines that the channel is idle in the sensing interval, the terminal apparatus 1 may obtain the right to access the channel and may thus perform uplink transmission through the channel. Alternatively, in a case where the terminal apparatus 1 determines that the channel is busy in the sensing interval, the terminal apparatus 1 may not either obtain the right to access the channel or perform uplink transmission through the channel. Note that the sensing interval may be 25 μs.

Next, physical channels and physical signals according to the present embodiment will be described.

In FIG. 1, in uplink radio communication (uplink transmission) from the terminal apparatus 1 to the base station apparatus 3, the following uplink physical channels are used. The uplink physical channels are used for transmitting information output from a higher layer. The higher layer in the following description may include an RRC layer and/or a MAC layer.

Physical Uplink Shared Channel (PUSCH)
Physical Random Access Channel (PRACH)
Physical Uplink Control Channel (PUCCH)

The PUCCH is used for transmitting uplink data (Transport block, Uplink-Shared Channel: UL-SCH), CSI (Channel State Information) of downlink, and/or, HARQ-ACK (Hybrid Automatic Repeat reQuest). The CSI, as well as the HARQ-ACK, is Uplink Control Information (UCI).

The CSI includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI represents the number of effective layers determined by the terminal apparatus 1. The PMI represents a code book determined by the terminal apparatus 1. The code book is associated with the precoding of the PDSCH.

The HARQ-ACK corresponds to downlink data (Transport block, Medium Access Control Protocol Data Unit (MAC PDU), Downlink-Shared Channel (DL-SCH), Physical Downlink Shared Channel: PDSCH). The HARQ-ACK indicates an acknowledgement (ACK) or a negative-acknowledgement (NACK). The HARQ-ACK is referred also to as ACK/NACK, HARQ feedback, HARQ response, HARQ information, or HARQ control information.

The PRACH is used to transmit a preamble to be used for a random access (random access preamble). The PRACH is used for indicating the initial connection establishment procedure, the handover procedure, the connection re-establishment procedure, synchronization (timing adjustment) for uplink transmission, and the request for the PUSCH (UL-SCH) resource. The PRACH is used by the terminal apparatus 1 to access the base station apparatus 3 (or a cell).

The PUCCH is used to transmit Uplink Control Information (UCI). Here, the Uplink Control Information may include Channel State Information (CSI) for the downlink. The Uplink Control Information may include a Scheduling Request (SR) used to request a UL-SCH resource. The Uplink Control Information may include Hybrid Automatic Repeat request ACKnowledgment (HARQ-ACK).

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of Uplink Reference Signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS to measure the channel state. The SRS is transmitted as the last SC-FDMA symbol in the uplink subframe or as the SC-FDMA symbol in the UpPTS.

In FIG. 1, the following downlink physical channels are used for downlink radio communication (downlink transmission) from the base station apparatus 3 to the terminal apparatus 1. The downlink physical channels are used for transmitting information output from the higher layer.

Physical Downlink Control Channel (PDCCH)

Physical Downlink Shared Channel (PDSCH)

The PDSCH is used to transmit downlink data (Transport block, Downlink-Shared Channel (DL-SCH)).

The PDCCH is used to transmit Downlink Control Information (DCI). The Downlink Control Information is referred also to as DCI format. The Downlink Control Information includes an uplink grant and a downlink grant. The uplink grant may be used for scheduling a single PUSCH within a single cell. The uplink grant may be used for scheduling a plurality of PUSCHs in a plurality of consecutive subframes within a single cell. The uplink grant may be used for scheduling of a single PUSCH within the fourth or later subframe from the subframe in which the uplink grant is transmitted. The downlink grant may be used for scheduling a single PDSCH within a single cell. The downlink grant is referred also to as "downlink assignment."

The DCI format 0A may be used for scheduling the PUSCH in the LAA cell. The DCI format 0B may be used for scheduling the PUSCH in each of the plurality of subframes in the LAA cell. Each of the DCI format 0A and the DCI format 0B includes the uplink grant. Each of the DCI format 0A and the DCI format 0B may include a PUSCH trigger A' field and a 'Timing offset' field. Each of the DCI format 0A and the DCI format 0B may include PUSCH scheduling information. The PUSCH scheduling information may include: information indicating the resource block allocation for PUSCH; transmit power control command for PUSCH; information indicating the modulation scheme for PUSCH; and information indicating the transport block size for PUSCH.

The DCI format 1A may be used for scheduling the PDSCH in the LAA cell. The DCI format 1A includes the downlink grant.

The DCI format 1C is used for the LAA common information. The LAA common information may include an 'Uplink transmission duration and offset indication' and/or a PUSCH trigger B'. The DCI format 1C includes no information for scheduling the PUSCH.

The Cyclic Redundancy Check (CRC) parity bits attached to the downlink control information transmitted by a single PDCCH may be scrambled with a Cell Radio Network Temporary Identifier (C-RNTI), a Temporary C-RNTI, a Random Access Radio Network Temporary Identifier (RA-RNTI), or a Common Control Radio Network Temporary Identifier (CC-RNTI).

The C-RNTI is an identifier for identifying a terminal apparatus within a cell. The C-RNTI is used to control the PDSCH transmission or the PUSCH transmission in a single subframe. The C-RNTI is used for unicast transmission (PDSCH transmission or PUSCH transmission) scheduled dynamically. The base station apparatus 3 may transmit, to the terminal apparatus 1, the information to be used for the C-RNTI determination in the terminal apparatus 1. The CRC parity bits to be attached to the DCI format (e.g., the DCI format 0A, the DCI format 0B, the DCI format 1A, etc.) including the uplink grant or the downlink grant may be scrambled with the C-RNTI.

The temporary C-RNTI is used during a contention based random access procedure. The Temporary C-RNTI is used to control PDSCH transmission or PUSCH transmission in a single subframe.

The RA-RNTI is used during a contention based random access procedure. The RA-RNTI is used to control the PDSCH transmission in a single subframe.

The CC-RNTI is used for the LAA common information. The value of the CC-RNTI may be a value that has been determined in advance in the specifications or the like. The CRC parity bits to be attached to the DCI format 1C to be used for the LAA common information may be scrambled with the CC-RNTI.

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

An asynchronous HARQ may be applied to the PUSCH (UL-SCH) of the present embodiment.

In FIG. 1, the following downlink physical signals are used for downlink radio communication. Here, the downlink physical signals are not used to transmit the information output from the higher layers but is used by the physical layer.

Synchronization Signal (SS)

Downlink Reference Signal (DL RS)

The synchronization signal is used for the terminal apparatus 1 to take synchronization in the frequency domain and the time domain in the downlink.

The Downlink Reference Signal is used for the terminal apparatus 1 to perform channel compensation on a downlink physical channel. The Downlink Reference Signal is used in order for the terminal apparatus 1 to obtain the downlink channel state information.

A configuration of the radio frame according to the present embodiment will be described below.

Figure 2:
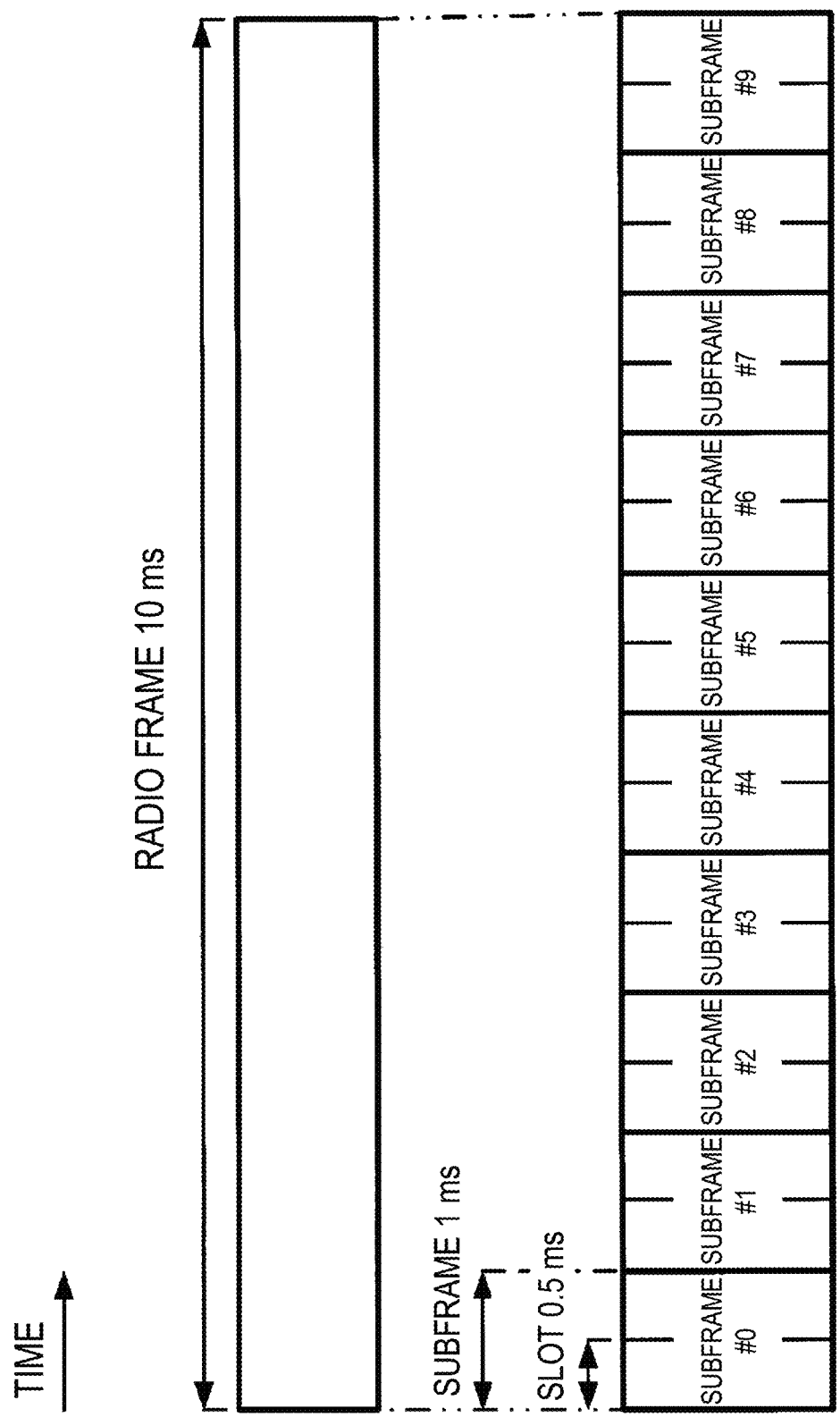
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames is 10 ms in length. In addition, each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes are available in each 10-ms spacing.

Figure 3:
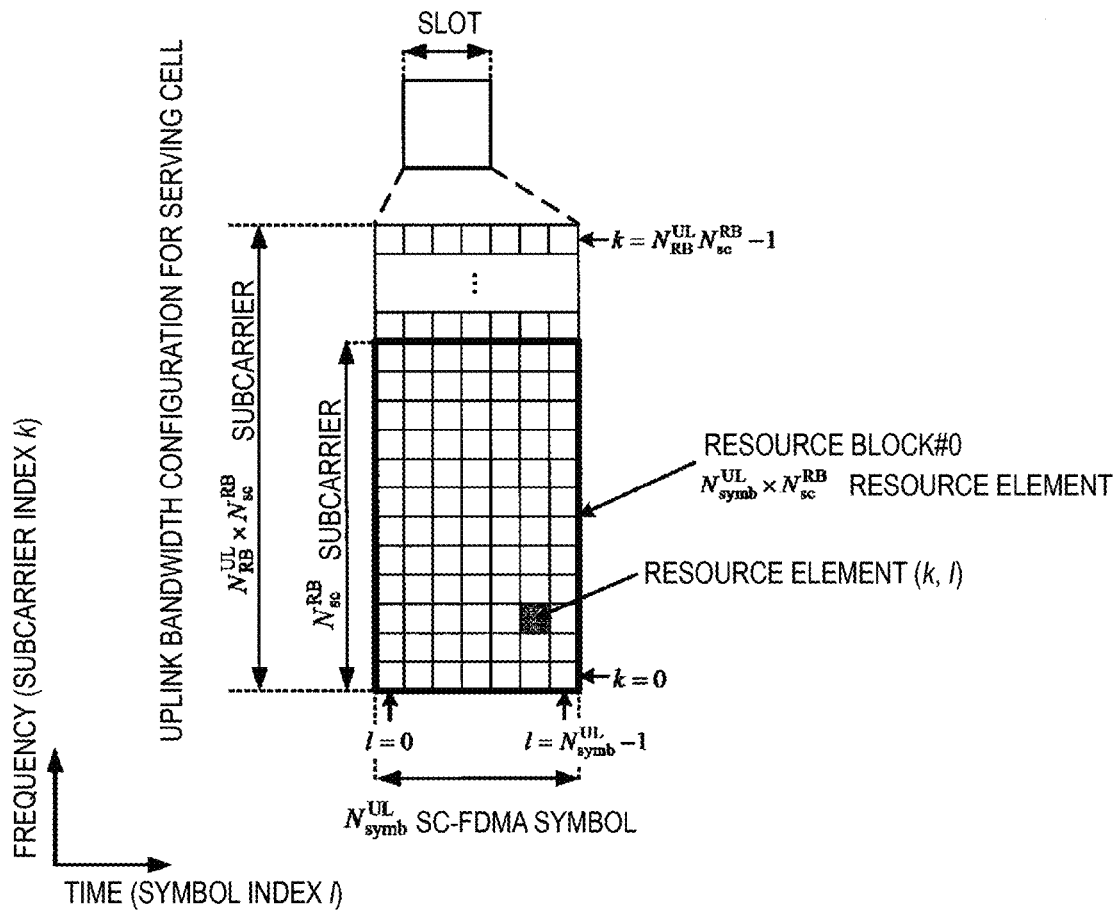
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. In FIG. 3, the letter 1 is an SC-FDMA symbol number/index, and the letter k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index 1.

The uplink slot includes multiple SC-FDMA symbols 1 (1=0, 1, ..., $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives, from the base station apparatus 3, the parameter UL-CyclicPrefixLength indicating the CP length in the uplink. The base station apparatus 3 may broadcast, in the cell, system information including the parameter UL-CyclicPrefixLength corresponding to the cell.

The uplink slot includes the plurality of subcarriers k (k=0, 1, . . . , $N^{UL}_{RB} \times N^{RB}_{SC}$) in the frequency domain. $N^{UL}RB$ is an uplink bandwidth configuration for the Serving cell expressed by a multiple of $N^{RB}_{SC}$. $N^{RB}_{SC}$ is the (physical) resource block size in the frequency domain expressed by the number of subcarriers. The subcarrier spacing Δf is 15 kHz, and $N^{RB}_{SC}$ may be 12. Hence, the $N^{RB}_{SC}$ may be 180 kHz. The subcarrier spacing Δf may be any other frequencies than 15 kHz. For example, the subcarrier spacing may be any of 3.75 kHz, 7.5 kHz, 15 kHz, 30 kHz, 60 kHz, 120 kHz, and 240 kHz.

A resource block (RB) is used to express mapping of a physical channel to resource elements. For the resource block, a virtual resource block (VRB) and a physical resource block (PRB) are defined. A physical channel is first mapped to a virtual resource block. Then, the virtual resource block is mapped to the physical resource block. One physical resource block is defined by $N^{UL}_{symb}$ consecutive SC-FDMA symbols in the time domain and by $N^{RB}_{SC}$ consecutive subcarriers in the frequency domain. Hence, one physical resource block is constituted of ($N^{UL}_{symb} \times N^{RB}sc$) resource elements. One physical resource block corresponds to one slot in the time domain. The physical resource blocks are numbered $n^{PRB}$ (0, 1, . . . , $N^{UL}RB$-1) in ascending order of frequencies in the frequency domain.

The downlink slot according to the present embodiment includes a plurality of OFDM symbols. The configuration of the downlink slot according to the present embodiment is basically the same as the configuration of the uplink slot except that the resource grid is defined by multiple subcarriers and multiple OFDM symbols. Hence, no more description will be given below about the configuration of the downlink slot.

Configurations of apparatuses according to the present embodiment will be described below.

Figure 4:
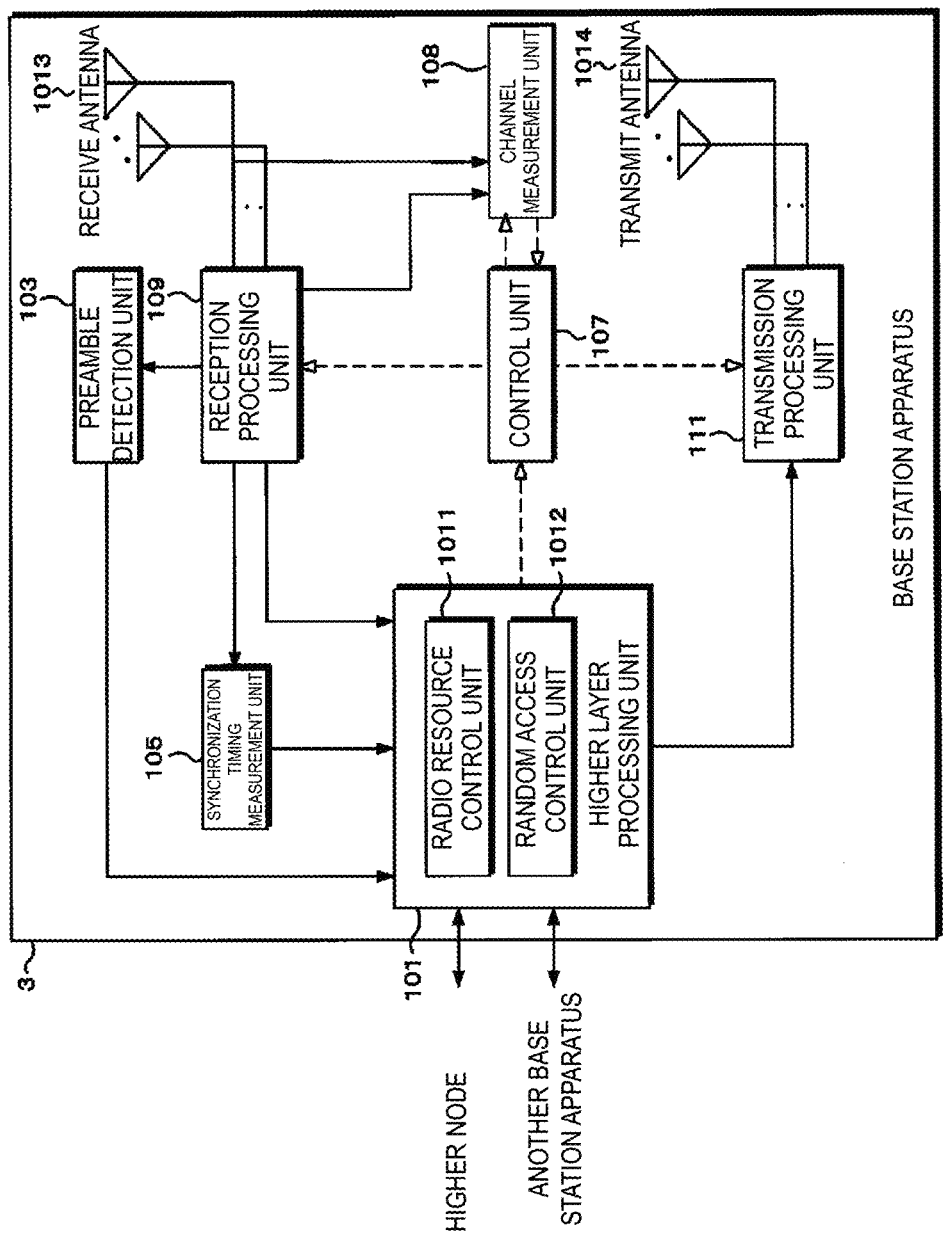
FIG. 4 is a schematic block diagram illustrating a configuration of a base station apparatus 3 according to the present embodiment.

FIG. 4 is a schematic block diagram illustrating a configuration of a base station apparatus 3 according to the present embodiment. As illustrated in FIG. 4, the base station apparatus 3 includes a higher layer processing unit 101, a preamble detection unit 103, a synchronization timing measurement unit 105, a control unit 107, a channel measurement unit 108, a reception processing unit 109, a plurality of receive antennas 1013, a transmission processing unit 111, and a plurality of transmit antennas 1014. The higher layer processing unit 101 includes a radio resource control unit 1011 and a random access control unit 1012. In FIG. 4, the receive antenna and the transmit antenna are illustrated as separate components, but a single antenna shared for the two purposes may be provided by use of a thyristor operable to switch the input and the output of signals.

The higher layer processing unit 101 outputs, to the transmission processing unit 111, data information for individual downlink component carriers. The higher layer processing unit 101 performs processing of the Packet Data Convergence Protocol (PDCP) layer, the Radio Link Control (RLC) layer, and the Radio Resource Control (RRC) layer. The radio resource control unit 1011 of the higher layer processing unit 101 manages various pieces of configuration information, the communication state and, the buffer state of each of the terminal apparatuses 1. The random access control unit 1012 of the higher layer processing unit 101 performs the control associated with the random access of each of the terminal apparatuses 1.

In the above-mentioned process, the radio resource control unit 1011 included in the higher layer processing unit 101 allocates multiple uplink component carriers and multiple downlink component carriers to the individual terminal apparatuses 1 in accordance with, among other things, the numbers of the downlink component carriers and of the uplink component carriers that can be used by the base station apparatus 3 for radio communications and the numbers of the downlink component carriers and of the uplink component carriers that each terminal apparatus 1 can transmit or receive simultaneously.

The radio resource control unit 1011 generates, or acquire from a higher node, the information mapped to each channel in each downlink component carrier, and outputs the information for each downlink component carrier to the transmission processing unit 111. For example, the radio resource control unit 1011 generates a random access response, which is a type of the downlink control information or of the data information, and outputs to the transmission processing unit 111.

The radio resource control unit 1011 selects, from the radio resources of the uplink component carrier allocated to the terminal apparatuses 1, some radio resources to which the terminal apparatuses 1 map the PUSCH (data information) and allocates the radio resources to the terminal apparatuses 1. In addition, the radio resource control unit 1011 selects, from the radio resources of the downlink component carrier allocated to the terminal apparatuses 1, some radio resources to which the PDSCH (data information) is mapped, and allocates the radio resources. The radio resource control unit 1011 generates the downlink grant and the uplink grant indicating the allocation of the radio resources, and transmits the downlink grant and the uplink grant via the transmission processing unit 111 to the terminal apparatuses 1. The radio resource control unit 1011 makes the downlink grant and the uplink grant include C-RNTI allocated to the terminal apparatuses 1 corresponding to the downlink grant and to the uplink grant.

Based on the control information from the random access control unit 1012, the radio resource control unit 1011 generates the PDCCH instructing the start of the random access processing. Based on the channel quality of the downlink component carrier allocated to the terminal apparatus 1 to which the instruction to start the random access processing is issued and/or on the overhead of the PDCCH, the radio resource control unit 1011 selects any one of the downlink component carriers, and transmits, to the terminal apparatus 1 via the transmission processing unit 111, the PDCCH using the selected downlink component carrier to instruct the start of the random access processing. In addition, the radio resource control unit 1011 makes the PDCCH that instructs the start of the random access processing include the information indicating the radio resource of the PRACH corresponding to the downlink component carrier allocated to the terminal apparatus 1 corresponding the PDCCH; the information indicating the index number of the random access preamble; and the C-RNTI.

Based on the control information from the random access control unit 1012, the radio resource control unit 1011 selects a single downlink component carrier and allocates one of the radio resources in the selected downlink component carrier for providing a random access response. In addition, the radio resource control unit 1011 makes the downlink grant indicating the allocation of the radio resource include the RA-RNTI input from the random access control unit 1012.

Based on the control information from the random access control unit 1012, the radio resource control unit 1011 selects a single uplink component carrier and allocates one of the radio resources in the selected uplink component carrier for providing a message 3. In addition, the radio resource control unit 1011 generates an uplink grant indicating the allocation of the radio resource, makes the random access response include the generated uplink grant, and transmits the random access response to the terminal apparatus 1 via the transmission processing unit 111. Note that the uplink grant included in the random access response includes neither the cyclic redundancy check code nor the terminal apparatus identifier. The random access response includes: the amount of synchronization timing deviation and the Temporary C-RNTI for each of the multiple random access preambles input from the random access control unit 1012; and the uplink grant generated by the radio resource control unit 1011.

Based on the uplink control information (the ACK/NACK, the channel quality information, the scheduling request) notified of by the terminal apparatus 1 via the PUCCH, on the buffer state of the terminal apparatus 1, and on various kinds of configuration information of each terminal apparatus 1 set by the radio resource control unit 1011, the radio resource control unit 1011 generates control information to control the reception processing unit and the transmission processing unit, and outputs the generated control information to the control unit.

In the above-described processing, the random access control unit 1012 included in the higher layer processing unit 101 generates: a pair of uplink component carrier and downlink component carrier configured to transmit and/or receive some or entire part of the message; the configuration of the PRACH in the uplink component carrier (allocation of the radio resource of the PRACH); broadcast information including the information associated with the random access such as the information indicating the transmission state of random access (random access load); the random access response; the contention resolution; etc. The random access control unit 1012 outputs the control information to the radio resource control unit 1011 to make the transmission processing unit 111 transmit the above-mentioned generated information and the like to the terminal apparatus 1.

The random access control unit 1012 configures a PRACH corresponding to a particular downlink component carrier capable of staring the random access processing in each terminal apparatus 1 based on the random access transmission state, the channel quality of the uplink component carrier, and/or the like. The random access control unit 1012 generates information indicating the configured particular downlink component carrier, makes the radio resource control signal or the like include the generated information. The random access control unit 1012 outputs the control information to the radio resource control unit 1011 to make the transmission processing unit 111 transmit the radio resource control signal or the like to each of the terminal apparatuses 1.

In a case, for example, where there is data information to be transmitted to the terminal apparatus 1 but the base station apparatus 3 and the terminal apparatus 1 are not synchronized with each other, the random access control unit 1012 determines to instruct the terminal apparatus 1 to start the random access processing. The random access control unit allocates the radio resource of the PRACH and the preamble corresponding to the particular downlink component carrier configured in the terminal apparatus 1. The random access control unit 1012 outputs the control information to the radio resource control unit 1011 so as to generate a PDCCH instructing the terminal apparatus 1 to start the random access processing and to make the generated PDCCH to be output to the transmission processing unit 111.

Based on the PRACH information, the preamble number, and the amount of synchronization timing deviation all of which are input from the preamble detection unit 103, the random access control unit 1012 outputs the control information to the radio resource control unit 1011 so as to output the preamble number and the amount of synchronization timing deviation to the radio resource control unit 1011 and to make radio resource control unit 1011 generate the random access response. In addition, the random access control unit 1012 calculates the RA-RNTI based on the information on the PRACH detecting the preamble input from the preamble detection unit 103, and outputs the calculated RA-RNTI to the radio resource control unit 1011.

The random access control unit 1012 outputs the control information to the radio resource control unit 1011 so that the downlink component carrier paired with the uplink component carrier where the random access preamble has been detected is selected based on the information of PRACH detecting the preamble input from the preamble detection unit 103 and that the random access response is transmitted with the selected downlink component carrier. In addition, the random access control unit 1012 outputs the control information to the radio resource control unit 1011 so that the uplink component carrier where the random access preamble has been detected is selected and that the radio resource to be used for the transmission of the message 3 is allocated from radio resources of the selected uplink component carrier.

The random access control unit 1012 outputs the control information to the radio resource control unit 1011 so that the contention resolution is transmitted with the downlink component carrier to the terminal apparatus 3 to which the message 3 with the radio resource allocated by the random access response has been transmitted.

In accordance with the control information originating from the higher layer processing unit 101, the control unit 107 generates a control signal for control of the reception processing unit 109 and the transmission processing unit 111. The control unit 107 outputs the generated control signal to the reception processing unit 109 and the transmission processing unit 111 to control the reception processing unit 109 and the transmission processing unit 111.

In accordance with the control signal input from the control unit, the reception processing unit 109 demultiplexes, demodulates, and decodes the reception signal received from the terminal apparatus 1 through the receive antenna, and outputs information resulting from the decoding to the higher layer processing unit 101. In addition, the reception processing unit 109 outputs the demultiplexed uplink reference signal to the synchronization timing measurement unit 105, and the demultiplexed PRACH to the preamble detection unit 103.

Specifically, the reception processing unit 109 converts (down-converts) each uplink component carrier signal received through the corresponding receive antenna into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The reception processing unit 109 removes a portion corresponding to the Guard Interval (GI) from the digital signal resulting from the conversion. The reception processing unit 109 performs Fast Fourier Transform (FFT) on the signal from which the Guard Interval has been removed, and extracts a signal in the frequency domain.

The reception processing unit 109 demultiplexes the extracted signals, for each uplink component carrier, into the signals mapped in the PRACH, the PUCCH, the PUSCH, the DMRS, and the SRS. The demultiplexing is performed based on the radio resource allocation information that is determined in advance by the base station apparatus 3 and that is notified to each of the terminal apparatuses 1. In addition, the reception processing unit 109 obtains the channel estimate from the demultiplexed uplink reference signal and thus performs the compensation of channel for the PUCCH and for the PUSCH.

The reception processing unit 109 outputs the demultiplexed PRACH to the preamble detection unit 103, and outputs the demultiplexed uplink reference signal to the synchronization timing measurement unit 105. The reception processing unit 109 performs Inverse Discrete Fourier Transform (IDFT) on PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), Quadrature Phase Shift Keying (QPSK), 16Quadrature Amplitude Modulation (16QAM), and 64Quadrature Amplitude Modulation (64QAM), or in compliance with the modulation scheme that the base station apparatus 3 has notified each terminal apparatus 1 of, in advance, with the uplink grant.

The reception processing unit 109 decodes the coded bits of the demodulated PUCCH and PUSCH, at the coding rate in compliance with a coding scheme prescribed in advance, the coding rate being prescribed in advance or being notified in advance with the uplink grant to the terminal apparatus 1 by the base station apparatus 3. The reception processing unit 109 then outputs the data information and uplink control information to the higher layer processing unit 101. The reception processing unit 109 measures, among other things, the electric power of the uplink reference signal received from the terminal apparatus 1 and the electric power of the PUSCH reception signal, and also measures the reception quality of the channel of the uplink component carrier. The measurement results are outputted to the higher layer processing unit 101.

The preamble detection unit 103 detects multiple random access preambles from the radio resources of the PRACH input from the reception processing unit 109, and calculates, from each random access preamble, the amount of synchronization timing deviation. The preamble detection unit 103 outputs, to the higher layer processing unit 101, the information on the PRACH detecting the preambles, the preamble number, and the amount of synchronization timing deviation. In addition, the higher layer processing unit 101 is regularly notified of the random access transmission state of the terminal apparatus 1 based on the number of received random access preambles. To keep the synchronization, the synchronization timing measurement unit 105 measures the uplink reference signal input from the reception processing unit 109, measures the synchronization timing deviation, and reports the measurement results to the higher layer processing unit 101.

In accordance with the control signal input from the control unit 107, the transmission processing unit 111 generates the downlink reference signal; encodes and modulates the data information and the downlink control information input from the higher layer processing unit 101, and maps the resultant information in the PDCCH and the PDSCH; multiplexes the information with the generated downlink reference signal; and transmits the multiplexed signal to the terminal apparatus 1 via the transmit antenna.

Specifically, in accordance with the control signal input from the control unit 107, the transmission processing unit 111 performs encoding, such as turbo coding, convolutional coding, and block coding, on the downlink control information of each downlink component carrier input from the higher layer processing unit 101 and data information, and modulates the coded bits in compliance with the modulation scheme such as QPSK, 16QAM, and 64QAM. In addition, the transmission processing unit 111 generates, as the downlink reference signal, a sequence that is already known to the terminal apparatus 1 and that is acquired in accordance with a rule predetermined in advance, based on the Cell Identity (Cell ID) for identifying the base station apparatus 3, and the like. The transmission processing unit 111 multiplexes the PDCCH and PDSCH with the generated downlink reference signal.

The transmission processing unit 111 performs Inverse Fast Fourier Transform (IFFT) on the multiplexed modulation symbol, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit antenna for transmission.

Note that the base station apparatus 3 that operates in the LAA cell is configured to include a channel measurement unit 108 configured to perform the LBT procedure and thus to determine whether the channel is idle or busy. The channel measurement unit 108 is implemented with, among other methods, a method for determination using power received through the receive antenna 1013 and a method for determination depending on whether a specific signal from the reception processing unit 109 has been detected. A determination result from the channel measurement unit 108 is transmitted to the control unit 107 and used to control the transmission.

Figure 5:
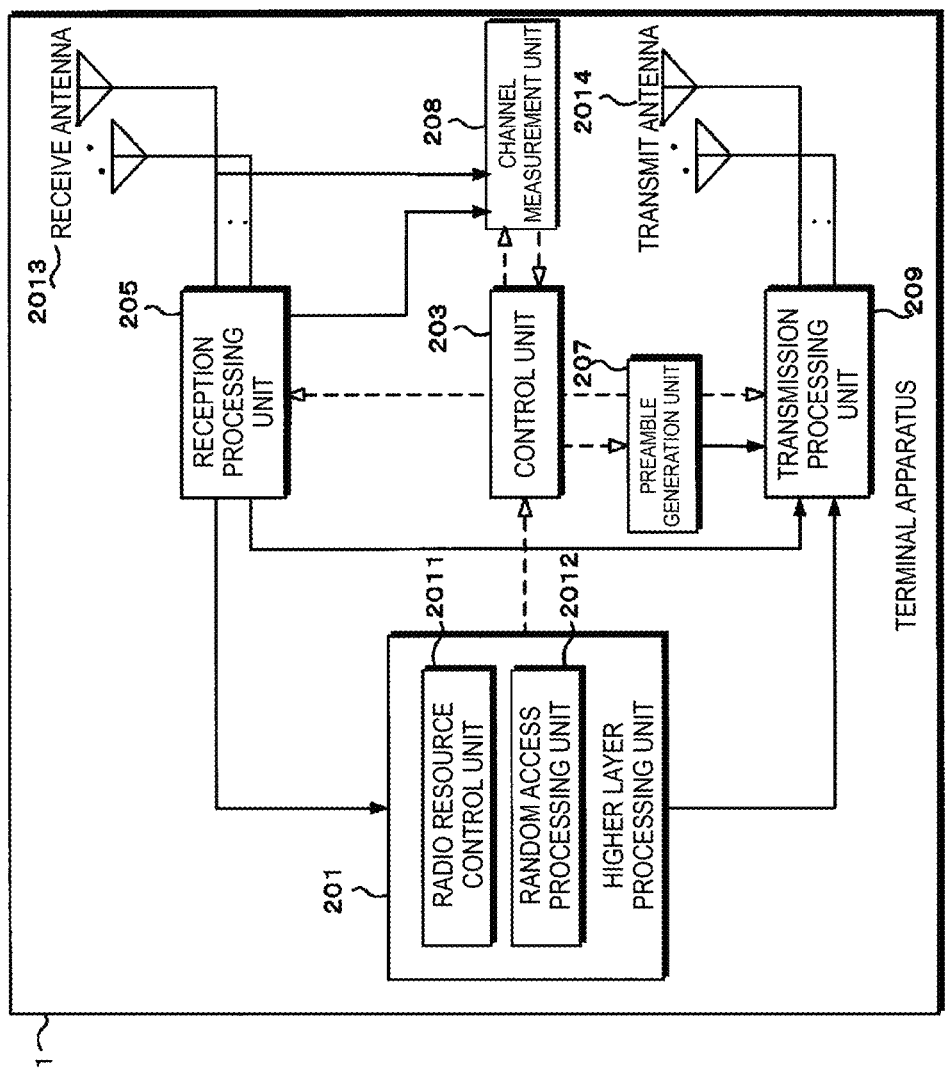
FIG. 5 is a schematic block diagram illustrating a configuration of a terminal apparatus 1 according to the present embodiment.

FIG. 5 is a schematic block diagram illustrating a configuration of the terminal apparatus 1 according to the present embodiment. As illustrated in FIG. 5, the terminal apparatus 1 includes a higher layer processing unit 201, a control unit 203, a reception processing unit 205, a plurality of receive antennas 2013, a preamble generation unit 207, a channel measurement unit 208, a transmission processing unit 209, and a plurality of transmit antennas 2014. In addition, the higher layer processing unit 201 includes a radio resource control unit 2011 and a random access processing unit 2012. Note that in FIG. 5, each of the receive antennas and each of the transmit antennas are illustrated as separate components, but a single antenna shared for the two purposes may be provided by use of a thyristor operable to switch the input and the output of signals.

The higher layer processing unit 201 outputs, to the transmission processing unit 209, the data information, for each uplink component carrier, generated by the user's operation or the like. In addition, the higher layer processing unit 201 performs the processing of the packet data convergence protocol layer, the radio link control layer, and the radio resource control layer. The radio resource control unit 2011 included in the higher layer processing unit 201 manages various pieces of configuration information, the communication state and, the buffer state of the corresponding terminal apparatus 1. The random access processing unit 2012 of the higher layer processing unit 201 performs the control associated with the random access of the corresponding terminal apparatus 1.

In the above-described processing, the radio resource control unit 2011 included in the higher layer processing unit 201 manages various pieces of configuration information, such as the downlink component carrier and the uplink component carrier as well as the C-RNTI allocated to the corresponding terminal apparatus 1. In addition, the radio resource control unit 2011 generates the information mapped in each channel of each uplink component carrier, and outputs the generated information for each of the uplink component carriers to the transmission processing unit 209. For example, in a case where the radio resource of the message 3 is allocated by the random access response, the radio resource control unit 2011 generates information to be transmitted in the message 3, and outputs the generated information to the transmission processing unit 209.

Based on the downlink control information (e.g., the downlink grant, the uplink grant) notified of with the PDCCH from the base station apparatus 3, the uplink grant for the message 3 notified of by the random access, and various pieces of configuration information of the corresponding terminal apparatus 1 managed by the radio resource control unit 2011, the radio resource control unit 2011 generates the control information to control the reception processing unit 205 and the transmission processing unit 209, and outputs the generated control information to the control unit 203.

In the above-described processing, the random access processing unit 2012 included in the higher layer processing unit 201 manages: a pair of uplink component carrier and downlink component carrier for transmission and/or reception of some or entire part of the message associated with the random access and broadcast by the base station apparatus 3; information associated with the random access such as the configuration of the PRACH corresponding to the downlink component carrier and the information indicating the transmission state of the random access; and the information notified of by the base station apparatus 3 and indicating the PRACH corresponding to the particular downlink component carrier capable of starting the random access processing. The random access processing unit 2012 starts the random access in a case where the terminal apparatus 1 receives, from the base station apparatus 3, the PDCCH instructing the start of the random access processing. In addition, the random access processing unit 2012 starts the random access in a case where there is data information to be transmitted via the uplink, but no radio resource of the uplink is allocated by the base station apparatus 3.

In a case where the random access processing unit 2012 is instructed, by the PDCCH from the base station apparatus 3, to start the random access, and in addition, where the preamble number and the radio resource of PRACH corresponding to the downlink component carrier are assigned, the random access processing unit 2012 selects, from the radio resources of the PRACH corresponding to a particular downlink component carrier configured for the base station apparatus 3, the PRACH and the preamble specified by the PDCCH instructing the start of the random access processing.

In addition, in a case where the preamble number and the radio resource of the PRACH are not assigned by the PDCCH instructing the start of the random access processing or in a case where the random access processing unit 2012 has decided to start the random access processing, the random access processing unit 2012 selects randomly the radio resource from the radio resources of the PRACH corresponding to the particular downlink component carrier capable of starting the random access processing, determines the range of the preamble for Contention based Random Access to be selected based on the information on the downlink channel quality, and selects randomly the preamble from the determined range of preambles. Hence, the terminal apparatus 1 can perform the Contention based Random Access with the appropriate random access resource corresponding to the particular downlink component carrier that the base station apparatus 3 has allocated in advance based on the channel quality of the uplink component carrier and the transmission state of the PRACH.

In addition, the random access processing unit 2012 outputs the control information to the control unit 203 so that the preamble generation unit 207 generates the random access preambles including the selected preamble. In addition, the random access processing unit 2012 outputs the control information to the control unit 203 so that the transmission processing unit 209 transmits the random access preamble with the radio resource of the selected PRACH.

The random access processing unit 2012 calculates the RA-RNTI corresponding to the radio resource with which the random access preamble is transmitted. In addition, the random access processing unit 2012 outputs the control information to the control unit 203 so that the reception processing unit 205 monitors the downlink grant including the calculated RA-RNTI in the downlink component carrier paired with the uplink component carrier with which the random access preamble has been transmitted. The monitoring continues in a random access response reception period (random access response window), which is a predetermined period since the transmission of the random access preamble.

In a case where the preamble number is specified by the base station apparatus 3, the random access processing unit 2012 determines that the random access is successful provided that the preamble number specified by the base station apparatus 3 is included in the random access response where the downlink grant including the calculated RA-RNTI indicates the allocation of the radio resources, and thus finishes the processing associated with the random access processing.

In a case where the preamble number is not specified by the base station apparatus 3, the random access processing unit 2012 detects, from random access response where the downlink grant including the calculated RA-RNTI indicates the allocation of the radio resources the preamble number included in the random access preambles transmitted from the corresponding terminal apparatus 1. In addition, the random access processing unit 2012 acquires the uplink grant indicating the amount of the synchronization timing deviation, the Temporary C-RNTI, and allocation of the radio resources of the message 3 corresponding to the detected preamble number. In addition, the random access processing unit 2012 outputs the control information to the control unit 203 so that the transmission processing unit 209 adjusts the timing for transmitting the uplink signal based on the amount of synchronization timing deviation.

In addition, the random access processing unit 2012 outputs, to the radio resource control unit 2011, the uplink grant included in the random access response and destined to the corresponding terminal apparatus 1. In addition, the random access processing unit 2012 outputs the control information to the radio resource control unit 2011 so that the message 3 including the information such as the C-RNTI allocated to the base station apparatus 3 or the connectivity request is generated.

The random access processing unit 2012 monitors the contention resolution in the downlink component carrier allocated to the base station apparatus 3. The monitoring is performed during the contention resolution reception period (contention resolution timer), which is a predetermined period since the transmission of the message 3. In a case where the random access processing unit 2012 detects the contention resolution in the downlink component carrier, the random access processing unit 2012 determines that the random access has been successful, and thus finished the processing associated with the random access.

Based on the control information originating from the higher layer processing unit 201, the control unit 203 generates a control signal for controlling the reception processing unit 205, the preamble generation unit 207, and the transmission processing unit 209. The control unit 203 outputs the generated control signal to the reception processing unit 205, the preamble generation unit 207, and the transmission processing unit 209. The control unit 203 thus controls the reception processing unit 205, the preamble generation unit 207, and the transmission processing unit 209.

In accordance with the control signal input from the control unit 203, the reception processing unit 205 demodulates and decodes a reception signal received from the base station apparatus 3 through the receive antenna, and outputs the resultant decoded information to the higher layer processing unit 201. The reception processing unit 205 generates the channel quality information based on, among other things, the reception quality of the detected downlink reference signal, and outputs the generated channel quality information to the higher layer processing unit 201 and the transmission processing unit 209.

Specifically, the reception processing unit 205 converts (down-converts) each uplink component carrier signal received through the corresponding receive antenna into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The reception processing unit 205 removes a portion corresponding to the Guard Interval from the digital signal resulting from the conversion. The reception processing unit 205 performs Fast Fourier Transform on the signal from which the Guard Interval has been removed, and extracts a signal in the frequency domain.

The reception processing unit 205 demultiplexes, for each downlink component carrier, the extracted signal into signals mapped in the PDCCH, the PDSCH, and in the downlink reference signal. Note that the demultiplexing is performed based on the radio resource allocation information that has been notified of with the downlink grant. In addition, the reception processing unit 205 obtains the channel estimate from the demultiplexed downlink reference signal and thus performs the compensation of channel for the PDCCH and for the PDSCH. The reception processing unit 205 generates the channel quality information based on, among other things, the reception quality of the demultiplexed downlink reference signal, and outputs the generated channel quality information to the higher layer processing unit 201 and the transmission processing unit 209.

The reception processing unit 205 demodulates the PDCCH in compliance with the QPSK modulation scheme. The reception processing unit 205 monitors the downlink grant and the uplink grant including the C-RNTI allocated by the base station apparatus 3 to the corresponding terminal apparatus 1. The reception processing unit 205 also monitors the downlink grant including the RA-RNTI corresponding to the radio resource of the PRACH with which the corresponding terminal apparatus 1 transmits the random access preamble. The reception processing unit 205 thus tries to perform decoding. In a case where the reception processing unit 205 succeeds in the decoding of the PDCCH, the reception processing unit 205 outputs the decoded downlink control information to the higher layer processing unit 201. The reception processing unit 205 demodulates the PDSCH in compliance with the modulation scheme, such as QPSK, 16QAM, and 64QAM, notified of with the downlink grant. The reception processing unit 205 performs the decoding corresponding to the coding rate notified of with the downlink grant. The reception processing unit 205 outputs the decoded data information to the higher layer processing unit 201.

The preamble generation unit 207 generates, in accordance with the control signal input from the control unit 203, random access preambles including the preamble selected by the random access processing unit 2012. The preamble generation unit 207 outputs the generated random access preambles to the transmission processing unit 209.

The transmission processing unit 209 generates the uplink reference signal in accordance with the control signal input from the control unit 203. The transmission processing unit 209 encodes and modulates the data information input from the higher layer processing unit 201 and the channel quality information input from the reception processing unit 205. The transmission processing unit 209 maps the encoded and modulated information in the PUSCH and the PUCCH, and multiplexes the information with the generated uplink reference signal. The transmission processing unit 209 transmits the resultant information to the base station apparatus 3 via the transmit antenna. In accordance with the control signal input from the control unit 203, the transmission processing unit 209 maps the random access preamble input from the preamble generation unit 207 in the PRACH, and transmits the PRACH via the transmit antenna to the base station apparatus 3.

Specifically, in accordance with the control signal input from the control unit 203, the transmission processing unit 209 performs encoding, such as turbo coding, convolutional coding, and block coding, on the uplink control information of each uplink component carrier input from the higher layer processing unit 201 and reception processing unit 205, and modulates the coded bits in compliance with the modulation scheme such as BPSK, QPSK, 16QAM, and 64QAM.

The transmission processing unit 209 generates, as the uplink reference signal, a sequence that is already known to the base station apparatus 3 and that is acquired in accordance with a rule prescribed in advance based on, among other things, the cell identity for identifying the base station apparatus 3. The transmission processing unit 209 spreads the modulation symbols of the PUCCH with codes. In addition, the transmission processing unit 209 rearranges the modulation symbols of the PUSCH in parallel and then performs the Discrete Fourier Transform (DFT) to generate the uplink reference signal. The spread modulation symbols are multiplexed with the generated uplink reference signal. In addition, the transmission processing unit 209 maps the random access preambles input from the preamble generation unit 207 in the PRACH.

The transmission processing unit 209 performs Inverse Fast Fourier Transform on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit antenna transmission.

Note that the terminal apparatus 1 that operates in the LAA cell is configured to include a channel measurement unit 208 configured to perform the LBT procedure and thus to determine whether the channel is idle or busy. The channel measurement unit 208 is implemented with, among other methods, a method for determination using power received through the receive antenna 2013 and a method for determination depending on whether a specific signal from the reception processing unit 205 has been detected. A determination result from the channel measurement unit 208 is transmitted to the control unit 203 and used to control the transmission.

Each of the units having the reference signs 201 to 2014 included in the terminal apparatus 1 may be configured as a circuit. Each of the units having the reference signs 101 to 1014 included in the base station apparatus 3 may be configured as a circuit.

The PUSCH transmission timing in the LAA cell will be described in detail below.

Each of the DCI format 0A and the DCI format 0B includes the PUSCH trigger A' field and the 'Timing offset' field. The DCI format 0B includes the 'number of scheduled subframes' field. The information bit where the PUSCH trigger A' field is mapped is referred also to as the "PUSCH trigger A'." The value of the information bit where the PUSCH trigger A' field is mapped is referred also to as the "value of the PUSCH trigger A'." The same rule also applies to the other fields.

The DCI format 1C may include an 'Uplink transmission duration and offset indication' field and/or a PUSCH trigger B' field.

In a case where a PDCCH including the DCI format 0A including a PUSCH trigger A' field that is set to zero is detected in a subframe n, the terminal apparatus 1 may perform PUSCH transmission in subframes n+k+l+i (i=0, 1, ..., N−1). In a case where a PDCCH including the DCI format 0B including a PUSCH trigger A' field that is set to zero is detected in a subframe n, the terminal apparatus 1 may perform PUSCH transmission in subframes n+k+l+i (i=0, 1, ..., N−1).

In a case where a PDCCH including the DCI format 0A including a PUSCH trigger A' field set to one is detected in a period from a subframe n−v to a subframe n−1, and in addition, where a PDCCH including the DCI format 1C is detected in a subframe n, the terminal apparatus 1 may perform PUSCH transmission in subframes n+k+l+i (i=0, 1, ..., N−1). In a case where a PDCCH including the DCI format 0B including a PUSCH trigger A' field set to one is detected in a period from a subframe n−v to a subframe n−1, and in addition, where a PDCCH including the DCI format 1C is detected in a subframe n, the terminal apparatus 1 may perform PUSCH transmission in subframes n+k+l+i (i=0, 1, ..., N−1). The above-mentioned period from a subframe n−v to a subframe n−1 includes both the subframe n−v to the subframe n−1. The 'Uplink transmission duration and offset indication' field and/or the PUSCH trigger B' field included in the DCI format 1C is set to a particular value. For example, the 'PUSCH trigger B' field may be set to one. For example, the 'Uplink transmission duration and offset indication' field may be set to a value that is not a prescribed value. The above-mentioned prescribed value may be 00000 and 11111. The fact that the 'Uplink transmission duration and offset indication' field and/or the PUSCH trigger B' field is set to a particular value is referred also to as the fact that the 'Uplink transmission duration and offset indication' field and/or the PUSCH trigger B' field is set to trigger the PUSCH transmission.

The symbol i represents an integer from 0 to N−1. The value N is an integer that is greater than zero. For the DCI format 0A, the value N is one. For the DCI format 0B, the value N is determined in accordance with the 'number of scheduled subframes' in the field DCI format 0B.

In a case where the PUSCH trigger A' field is set to zero, the value k may be determined in accordance with the value of the 'Timing offset' field. In a case where the PUSCH trigger A' field is set to one, the value k may be determined in accordance with the values of the first and the second information bits of the 'Timing offset' field.

The symbol v represents the length of the validation duration. The validation duration may be referred also to as the "time window." In a case where the PUSCH trigger A' field is set to one, the values of the third and the fourth information bits of the 'Timing offset' field are used for representing the symbol v. In a case where the PUSCH trigger A' field is set to one, a 'validation duration' field may be mapped in the third and the fourth information bits of the 'Timing offset' field.

In a case where a PDCCH including the DCI format 0A/0B including a PUSCH trigger A' field set to one is detected in a subframe n−v, and in addition, where no PDCCH including the DCI format 1C is detected by a subframe n, the terminal apparatus 1 may cancel the PUSCH transmission corresponding to the DCI format 0A/0B. The 'Uplink transmission duration and offset indication' field and/or the PUSCH trigger B' field included in the DCI format 1C is set to a particular value. In a period from the time when a PDCCH including the DCI format 0A/0B including a PUSCH trigger A' field set to one is detected in a subframe n−v to the time when a DCI format 1C with an 'Uplink transmission duration and offset indication' field, and/or a 'PUSCH trigger B' field set to a particular value is detected, the triggered PUSCH transmission is pending. In a period from the time when a PDCCH including the DCI format 0A/0B including a PUSCH trigger A' field set to one is detected in a subframe n−v to the time when the PUSCH transmission is canceled, the triggered PUSCH transmission is pending. To put it differently, the PUSCH scheduled by the DCI format 0A/0B including a PUSCH trigger A' field set to one is valid for a validation duration indicated by the third and the fourth information bits of the 'Timing offset' field in the DCI format 0A/0B. To put it differently, the PUSCH scheduled by the DCI format 0A/0B including a PUSCH trigger A' field set to one is valid for a validation duration indicated by the third and the fourth information bits of the 'Timing offset' field in the DCI format 0A/0B. To put it differently, the scheduling of the PUSCH triggered by the DCI format 1C including a 'Uplink transmission duration and offset indication' field and/or a PUSCH trigger B' field set to a particular value is valid for the validation duration.

In a case where the PUSCH trigger A' field is set to zero, the value 1 may be a prescribed value (e.g., four). In a case where the PUSCH trigger A' field is set to one, the value 1 is an uplink offset (UL offset). The above-mentioned uplink offset may be determined by the 'Uplink transmission duration and offset indication' field included in the DCI format 1C.

Figure 6:
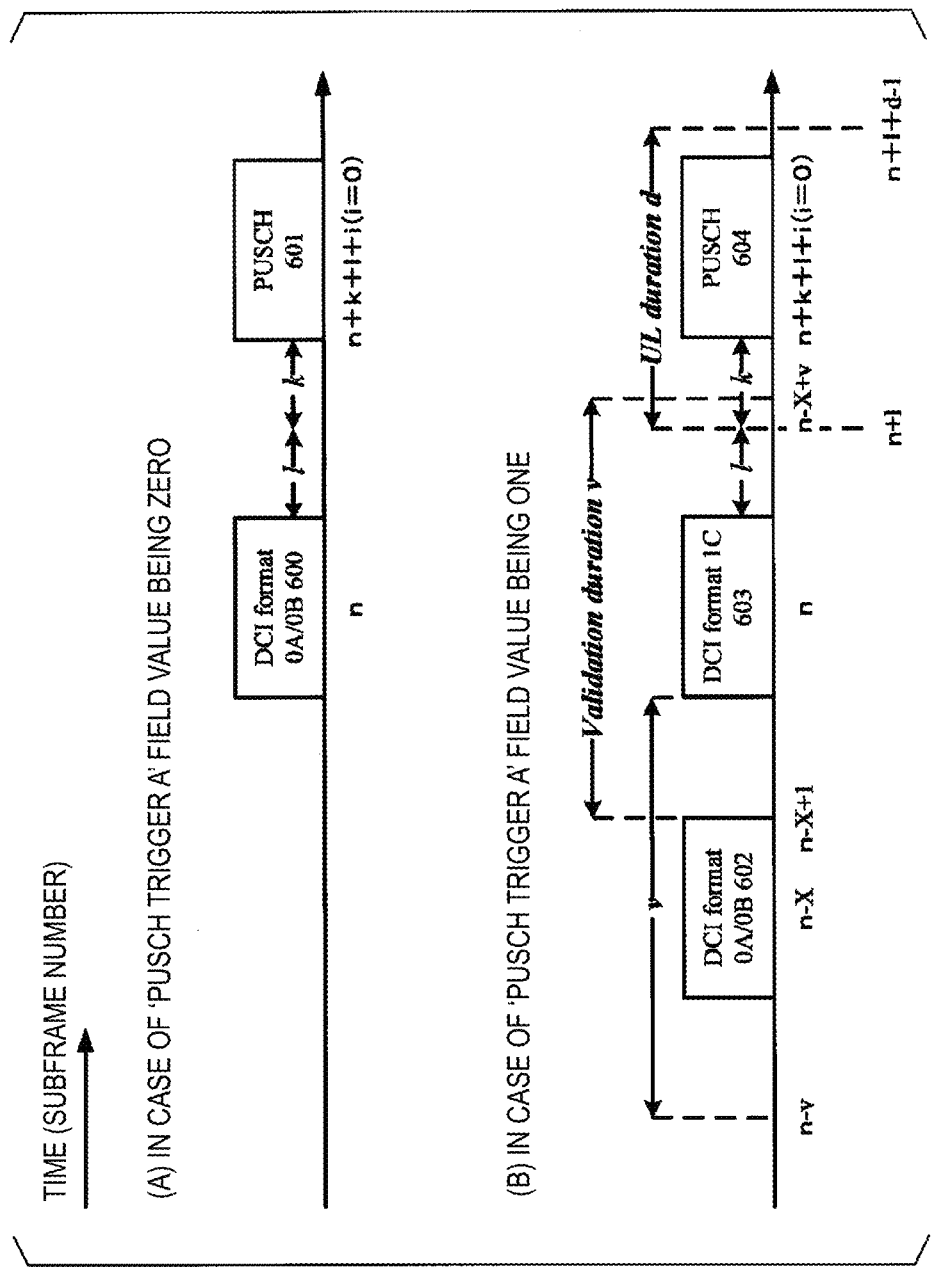
FIG. 6 is a diagram illustrating an example of a PUSCH scheduling in the present embodiment.

FIG. 6 is a diagram illustrating an example of a PUSCH scheduling in the present embodiment. In FIG. 6, the horizontal axis represents the time domain (i.e., subframe number). Parts (A) and (B) of FIG. 6 each illustrate up to one DCI format 0A/0B, up to one DCI format 1C, and up to one PUSCH. In a case where there are more than one DCI formats 0A/0B, more than one DCI formats 1C, and/or more than one PUSCHs, an operation that is different from the one in the present embodiment may be applied.

The DCI format 0A/0B (600) is either the DCI format 0A or the DCI format 0B. In the case of FIG. 6, the integer N is one. Hence, the value i is zero.

In part (A) of FIG. 6 the PUSCH trigger A' field included in the DCI format 0A/0B (600) is set to zero. The DCI format 0A/0B (600) is transmitted in the subframe n. The PUSCH (601) is scheduled by the uplink grant (600). The transmission of the PUSCH (601) is performed in the subframe n+k+l+i. In part (A) of FIG. 6, the symbol 1 represents a predetermined value (e.g., four), the value k is determined by 'Timing offset' field included in the DCI format 0A/0B (600).

The DCI format 0A/0B (602) is either the DCI format 0A or the DCI format 0B. In part (B) of FIG. 6 the PUSCH trigger A' field included in the DCI format 0A/0B (602) is set to one. The DCI format 0A/0B (602) is transmitted in the subframe n–X. The subframe n–X is located between the subframe n–v and the subframe n. The DCI format 1C (603) is transmitted in the subframe n. The DCI format 1C (603) is transmitted in the validation duration. The validation duration may start in a subframe that is later than the subframe n–x. For example, the validation duration may start in the subframe n–X+1 and will end in the subframe n–X+v. The length of the validation duration may be indicated by the third and the fourth information bits of the 'Timing offset' field in the DCI format 0A/0B (602).

The transmission of the PUSCH (604) is performed in the subframe n+k+l+i. In part (B) of FIG. 6, the value 1 is determined at least based on the 'Uplink transmission duration and offset indication' field in the DCI format 1C, the value k is determined at least based on the first and the second information bits of the 'Timing offset' field included in the DCI format 0A/0B (600).

The 'Uplink transmission duration and offset indication' field in the DCI format 1C may represents the length d of the uplink duration. For example, in part (B) of FIG. 6, the uplink duration may start in the subframe n+l, and in addition, may end in the subframe n+l+d−1. The terminal apparatus 1 may not monitor the PDCCH in the uplink duration. The terminal apparatus 1 may perform an uplink transmission in the uplink duration.

In addition, the DCI format 1C added with the CRC parity bits scrambled with the CC-RNTI may include a 'Subframe configuration for LAA' field. The 'Subframe configuration for LAA' field indicates the number of OFDM symbols to be used for the transmission of the downlink physical channel and/or physical signal in the current subframe or the next subframe. In a case where the 'Subframe configuration for LAA' field indicates the OFDM symbol in the next subframe, the terminal apparatus 1 may determine that the next subframe is the downlink subframe.

Each of the DCI format 0A and the DCI format 0B includes an 'LBT Type' field and a 'Priority class' field. The 'LBT Type' field indicates the type of the uplink LBT procedure to be used for the channel sensing that is to be performed before the terminal apparatus 1 performs the PUSCH transmission. The 'Priority class' field indicates the value of the channel access priority class of the type-1 uplink LBT procedure to be used in the channel sensing.

The terminal apparatus 1 may determine the type of and the channel access priority class of the uplink LBT procedure in accordance with the 'LBT Type' field and the 'Priority class' field included in the uplink grant (DCI format 0A and DCI format 0B). The terminal apparatus 1 may perform the channel sensing based on the determined type of the uplink LBT procedure and on the determined channel priority class. For example, in a case where the 'LBT Type' field indicates (notifies of) the type 1, the terminal apparatus 1 may perform the type-1 uplink LBT procedure based on the channel access priority class indicated by the 'Priority class' field and may then perform the PUSCH transmission. In an alternative case where, for example, the 'LBT Type' field indicates (notifies of) the type 2, the terminal apparatus 1 performs the type-2 uplink LBT procedure irrespective of the 'Priority class' field, and then performs the PUSCH transmission.

In an alternative case where, for example, the subframe to be used in the PUSCH transmission is in the uplink duration d, the terminal apparatus 1 may perform the type-2 uplink LBT procedure irrespective of the uplink LBT type that has been notified of by the uplink grant. To put it differently, in a case where the subframe to be used for the PUSCH transmission is in the uplink duration d, the terminal apparatus 1 may perform the type-2 uplink LBT procedure even when the uplink grant notifies the terminal apparatus 1 of the type 2 uplink LBT.

The random access procedure in the present embodiment will be described below.

In the present embodiment, a random access procedure may be performed in the primary cell, the secondary cell, or the LAA cell. Note that not more than one random access procedure is performed at any point in the time domain. To put it differently, no two or more random access procedures are performed simultaneously.

The random access procedure includes a contention based random access procedure and a non-contention based random access procedure.

In the present embodiment, a contention based random access procedure and a non-contention based random access procedure may be performed in the LAA cell. Note that in a case where an LAA cell is used as a primary cell or a Primary Secondary Cell, the contention based random access procedure and/or the non-contention based random access procedure may be performed in the LAA cell. Note that in a case where an LAA cell is used as a secondary cell, the non-contention based random access procedure and/or the contention based random access procedure may be performed in the LAA cell.

In addition, the non-contention based random access procedure may be started by a PDCCH order. The base station apparatus 3 transmits the PDCCH order to the terminal apparatus 1 on the PDCCH. The terminal apparatus 1 transmits a random access preamble on the PRACH. The PDCCH order is referred also to as the "random access message 0 (message)."

The DCI format 1A is used for the random access procedure that is to be started by the PDCCH order. The following kinds of information may be transmitted by use of the DCI format 1A. To put it differently, the PDCCH order may indicate at least some or all of the following kinds of information.

Random Access Preamble Index (Preamble Index)
PRACH Mask Index
Information on the random access procedure
LBT Type
Priority class An overview of the non-contention based random access procedure to be performed in an LAA cell will be described below.

Figure 7:
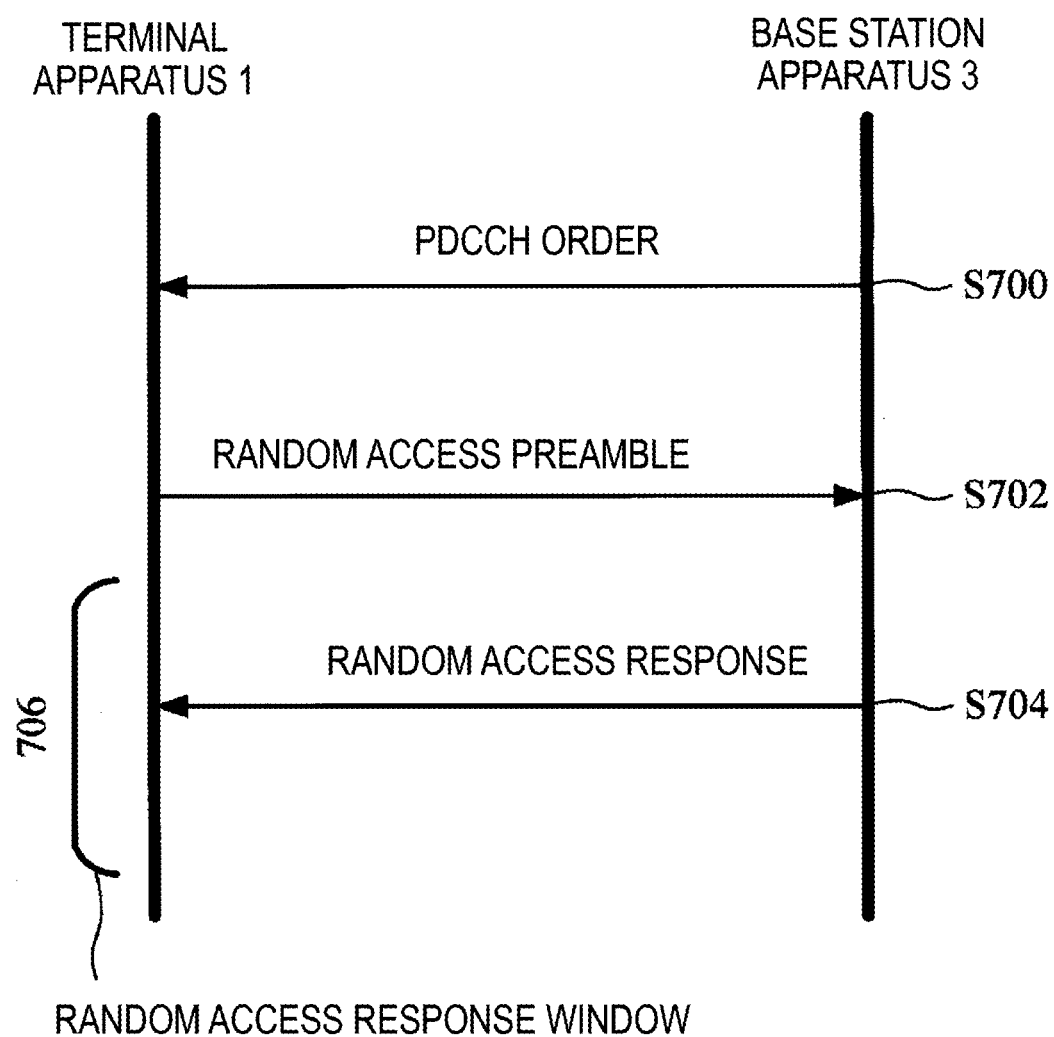
FIG. 7 is a diagram illustrating an example of a non-contention based random access procedure in the present embodiment.

FIG. 7 is a diagram illustrating an example of a non-contention based random access procedure in the present embodiment.

In Step S700, the base station apparatus 3 transmits the PDCCH order to the terminal apparatus 1 on the PDCCH. In Step S702, the terminal apparatus 1 transmits a random access preamble on the PRACH. The terminal apparatus 1 may select, based on the random access preamble index included in the PDCCH order, a random access preamble index to be transmitted in Step S702.

Then in Step S704, the base station apparatus 3 transmits a random access response corresponding to the random access preamble having been transmitted in Step S702. During the period of a random access response window 706, the terminal apparatus 1 monitors the PDCCH including the DCI format to which the CRC parity bits scrambled with the RA-RNTI are added. The RA-RNTI may be decided based on the PRACH resource that has been used for the random access preamble transmission in Step S702. The PDCCH including the DCI format to which the CRC parity bits scrambled with the RA-RNTI are added includes a downlink grant to be used for scheduling the PDSCH including the random access response.

In a case where the random access response corresponding to the random access preamble that has been transmitted in Step S702 is received, the terminal apparatus 1 considers that the reception of the random access response is successful and in addition, that the random access procedure has been completed successfully. Specifically, the random access response corresponding to the random access preamble includes a Random Access Preamble Identifier (RAPID, the random access preamble index) identifying the random access preamble that has been transmitted in Step S702. To put it differently, in a case where the random access response includes an RAPID corresponding to the random access preamble that has been transmitted in Step S702, the terminal apparatus 1 considers that the reception of the random access response is successful and in addition, that the random access procedure has been completed successfully.

The random access preamble is referred also to as the "random access message 1 (message 1)." The resource for the random access preamble transmission with the PRACH may be referred to as the "PRACH resource." The random access response is referred also to as the "random access message 2 (message 2)."

The random access response includes a random access response grant (uplink grant).

The random access response grant for the LAA cell may include at least some part or entire part of the following field (number of bits where the field is mapped).

'Flag for triggered scheduling' (1 bit)
'Timing offset' (4 bits)
'Resource allocation field' (6 bits)
'Modulation and coding scheme' (4 bits)
'TPC command for scheduled PUSCH' (3 bits)
'CSI request' (1 bit)
'LBT type' (1 bit)
'Priority class' (2 bits or 1 bit)
'PUSCH starting position' (2 bits)
'PUSCH ending symbol' (1 bit)

In the LAA cell, the 'Resource allocation field' field indicates the information on the resource block allocated for the uplink transmission. A 1-bit 'LBT Type' field indicates the type of the uplink LBT procedure. The 'TPC command for scheduled PUSCH' field is used for the configuration of the power for transmitting the message 3 in the PUSCH. The 'CSI request' field is used for indicating whether or not the aperiodic CSI report triggers. In the contention based random access procedure, the 1-bit 'CSI request' field may be reserved. The contention based random access procedure in the LAA cell does not have to include any 1-bit 'CSI request' field.

In addition, a 2-bit 'Priority class' field indicates four different kinds of channel access priority classes. In addition, the 'Priority class' field may be configured as 1 bit. In this case, the 1-bit 'Priority class' field indicates two different kinds of channel access priority classes. For example, the two different kinds of channel access priority classes may be the channel access priority class 1 and the channel access priority class 2.

The random access response grant for the LAA cell of the unlicensed band may be different from the 20-bit random access response grant for the cell of the licensed band in that the former can be of more than 20 bits. In a case where the random access response grant is configured to be of more than 20 bits in the LAA cell, the random access response length of the LAA cell included in the MAC layer PDU may be defined as a new bit number. For example, the random access response length may be defined to be 56 bits. The random access response length may be equal to the random access response length for the licensed band. In this case, the Reserved bit of the random access response may be re-used for the field of the random access response grant. For example, the Reserved bit may be re-used for the 'Flag for triggered scheduling' field of the random access response grant. Some of the above-described fields do not have to be included in the random access response grant. For example, the 'LBT type' field and the 'Priority class' field do not have to be included in the random access response grant. The bit numbers of the above-mentioned fields may be reduced. For example, the bit number of the 'Modulation and coding scheme' field may be reduced to 3 bits.

The 'Flag for triggered scheduling' field included in the random access response grant may be configured to be of 1 bit. The 'Timing offset' field may be configured to be of 4 bits. The timing for transmitting the uplink data is determined based on the 'Flag for triggered scheduling' and the 'Timing offset' field included in the random access response grant.

The terminal apparatus 1 that considers that the non-contention based random access procedure has been completed successfully may be transmit the PUSCH based on the random access response grant.

Figure 8:
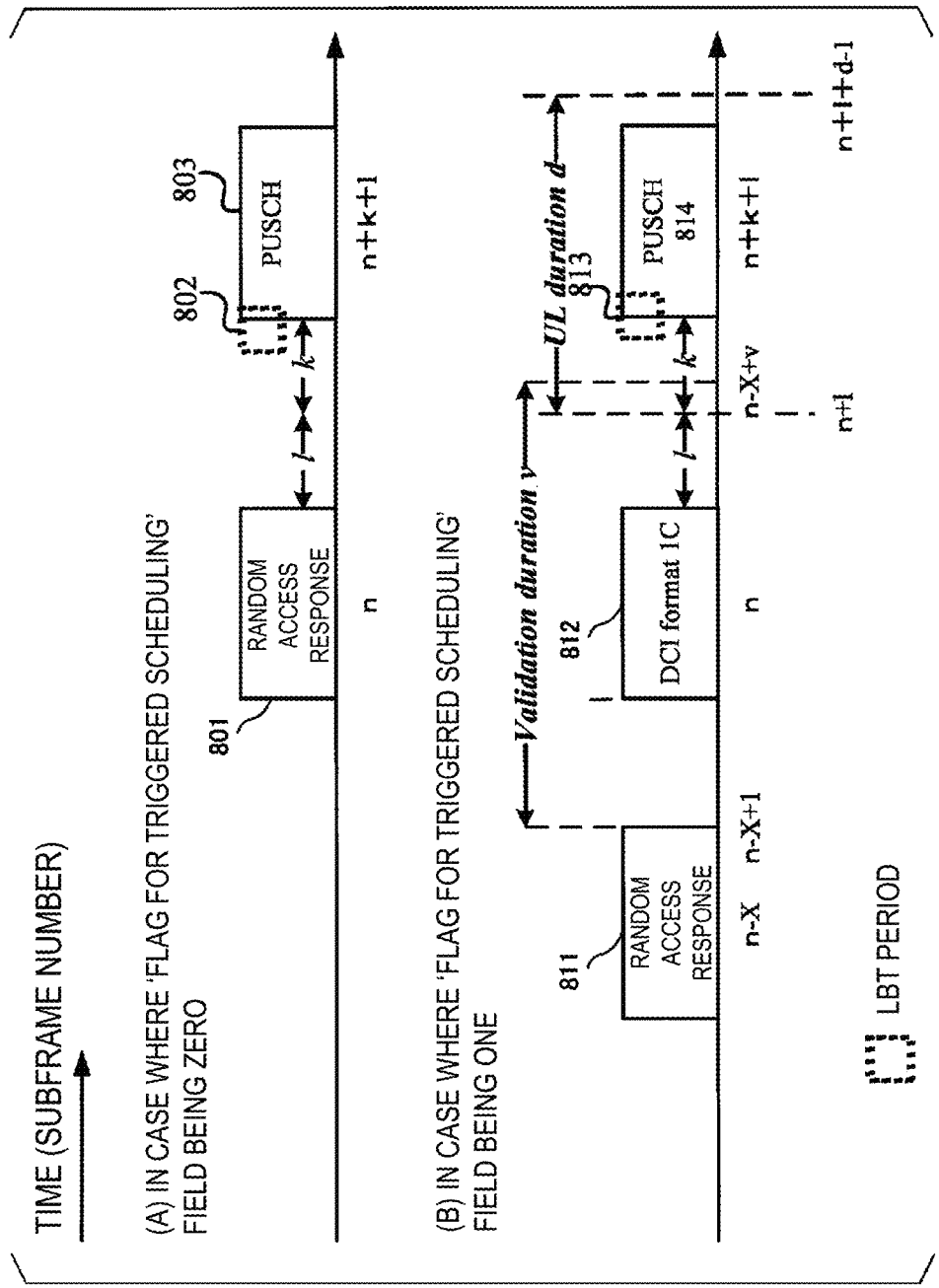
FIG. 8 is a diagram illustrating an example where a PUSCH transmission based on a random access response grant in the present embodiment is performed.

FIG. 8 is a diagram illustrating an example where a PUSCH transmission based on a random access response grant in the present embodiment is performed. The terminal apparatus 1 may determine, based on whether or not the random access response grant is included in the 'Flag for triggered scheduling' field, which of the operations of FIG. 8 to be taken. Alternatively, the terminal apparatus 1 may determine, based on whether the 'Flag for triggered scheduling' field included in the random access response grant is set to be zero or one, which of the operations of FIG. 8 to be taken. For example, in a case where the 'Flag for triggered scheduling' field is not included in the random access response grant, the terminal apparatus 1 may select the operation of part (A) of FIG. 8. Alternatively, for example, in a case where the 'Flag for triggered scheduling' field is included in the random access response grant and in addition, where the 'Flag for triggered scheduling' field is set to be zero, the terminal apparatus 1 may select the operation of part (A) of FIG. 8. Still alternatively, in a case where the 'Flag for triggered scheduling' field is included in the random access response grant and in addition, where the 'Flag for triggered scheduling' field is set to be one, the terminal apparatus 1 may select the operation of part (B) of FIG. 8.

In part (A) of FIG. 8, the terminal apparatus 1 receives a random access response 801 in a subframe n. The PUSCH 803 is scheduled by the random access response grant included in the received random access response. The transmission of the PUSCH 803 is performed in the subframe n+k+l+i. In part (A) of FIG. 8, the symbol 1 represents a predetermined value (e.g., six), and the symbol k is determined by the value of the 'Timing offset' field included in the random access response grant. The terminal apparatus 1 performs an LBT procedure in an LBT period 802. The terminal apparatus 1 may determine, based on LBT configuration information (LBT type, channel access priority class) included in the random access response grant, whether a type-1 uplink LBT procedure or a type-2 uplink LBT procedure is to be performed. Alternatively, in a case where no LBT configuration information is included in the random access response grant, the terminal apparatus 1 may determine the uplink LBT procedure based on the pre-configured LBT configuration information. The pre-configured LBT configuration information may be notified of by an RRC signaling from the base station apparatus 3. The pre-configured LBT configuration information may be configured in advance by specifications or the like. For example, in a case where no LBT configuration information is included in the random access response grant, the terminal apparatus 1 may perform a type-1 uplink LBT procedure with its value of the channel access priority class configured to be one.

In part (B) of FIG. 8, the terminal apparatus 1 receives a random access response 811 in a subframe n–X. Then, the terminal apparatus 1 monitors a DCI format 1C (812) in a Validation duration v. The Validation duration has a length v that may be indicated by the third and fourth information bits of the 'Timing offset' field included in the random access response grant. The transmission of the PUSCH 814 is performed in the subframe n+k+l+i. The value of the length l of the uplink offset (UL offset) and the value of the length d of the uplink duration (UL duration) is determined by the 'Uplink transmission duration and offset indication' field included in the detected DCI format 1C. The value k is determined based at least on the values of the first and the second information bits of the 'Timing offset' field included in the random access response grant.

Before the transmission of a PUSCH 814, the terminal apparatus 1 performs an LBT procedure in an LBT period 813. In a case where a scheduled PUSCH 814 is within a period of the uplink duration (UL duration) d, the terminal apparatus 1 may perform the type-2 uplink LBT procedure. Alternatively, in a case where a scheduled PUSCH 814 is outside of a period of the uplink duration (UL duration) d, and in addition, where the LBT configuration information is included in the random access response grant, the terminal apparatus 1 may determine to perform either the type-1 uplink LBT procedure or the type-2 uplink LBT procedure based on the LBT configuration information (LBT type, channel access priority class) included in the random access response grant. Still alternatively, in a case where a scheduled PUSCH 814 is outside of a period of the uplink duration (UL duration) d, and in addition, where no LBT configuration information is included in the random access response grant, the terminal apparatus 1 may determine, based on the pre-configured LBT configuration information, the uplink LBT procedure to be performed. The pre-configured LBT configuration information may be notified of by an RRC signaling from the base station apparatus 3. The pre-configured LBT configuration information may be configured in advance by specifications or the like. For example, in a case where no LBT configuration information is included in the random access response grant, the terminal apparatus 1 may perform a type-1 uplink LBT procedure with its value of the channel access priority class configured to be one.

Note that the minimum value of l+k and the minimum value of X in the example illustrated in part (B) of FIG. 6 may be different from their respective counterparts in the example illustrated in part (B) of FIG. 8. To put it differently, the minimum value of l+k and the minimum value of X may be given depending on which of the PDCCH and the PDSCH (random access response) includes the uplink grant. The terminal apparatus 1 may transmit, to the base station apparatus 3, first performance information indicating the minimum value of l+k and/or the minimum value of X. The minimum value of l+k in the example illustrated in part (B) of FIG. 8 may be greater than the minimum value of l+k in the example illustrated in part (B) of FIG. 6. In the example illustrated in part (B) of FIG. 6, the value of l+k may be equal to or greater than four. In the example illustrated in part (B) of FIG. 6, the value of X is equal to or greater than one. In the example illustrated in part (B) of FIG. 8, the value of l+k may be equal to or greater than six. In the example illustrated in part (B) of FIG. 8, the value of X is equal to or greater than three.

The minimum value of X+l+k in the example illustrated in part (B) of FIG. 6 may be different from its counterpart in the example illustrated in part (B) of FIG. 8. To put it differently, the minimum value of X+l+k may be given depending on which of the PDCCH and the PDSCH (random access response) includes the uplink grant. The terminal apparatus 1 may transmit, to the base station apparatus 3, second performance information indicating the minimum value of X+l+k. The minimum value of X+l+k in the example illustrated in part (B) of FIG. 8 may be greater than the minimum value of X+l+k in the example illustrated in part (B) of FIG. 6. In the example illustrated in part (B) of FIG. 6, the value of X+l+k may be equal to or greater than four. In the example illustrated in part (B) of FIG. 8, the value of X+l+k may be equal to or greater than six.

An overview of the contention based random access procedure to be performed in an LAA cell will be described below.

Figure 9:
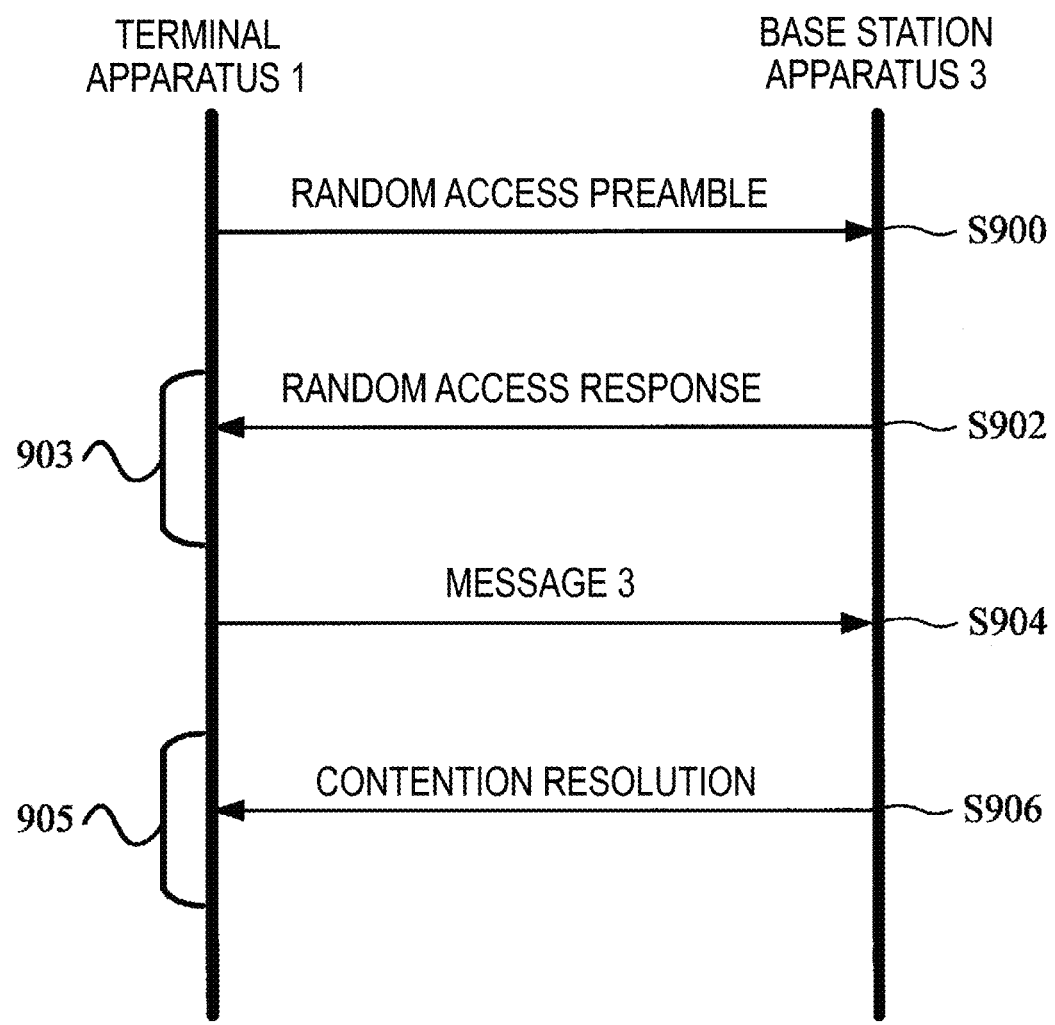
FIG. 9 is a diagram illustrating an example of a contention based random access procedure in the present embodiment.

FIG. 9 is a diagram illustrating an example of a contention based random access procedure in the present embodiment.

In Step S900, the terminal apparatus 1 transmits a random access preamble on the PRACH. The random access preamble is configured such that multiple sequences are used for notifying the base station apparatus 3 of the information. For example, 64 kinds of sequences (random access preamble index numbers 1 to 64) are provided for the above-mentioned purpose. In a case where the message 3 has a small transmission size, each of the terminal apparatuses 1 that perform the contention based random access procedure preamble selects randomly an index number from random access preamble index numbers 1 to 24. In a case where the message 3 has a large transmission size, each of the terminal apparatuses 1 that perform the contention based random access procedure randomly selects an index number from random access preamble index numbers 25 to 48. The indexes of the small-message-size case are typically selected in a case where the channel has unfavorable performance (or the distance between the terminal apparatus 1 and the base station apparatus 3 is large), whereas the indexes of the large-message-size case are selected in a case where the channel has favorable performance (or the distance between the terminal apparatus 1 and the base station apparatus 3 is small). The random access preamble index number may be referred also to as the random access preamble number. In a case of the contention based random access procedure, the terminal apparatus 1 itself selects randomly the random access preamble index.

Then in Step S902, the base station apparatus 3 transmits a random access response corresponding to the random access preamble having been transmitted in Step S900. The PDCCH corresponding to the PDSCH including the random access response (DL-SCH, transport block) includes a DCI format to which the CRC parity bits scrambled with the RA-RNTI are added. The PDCCH includes downlink control information (downlink grant). The terminal apparatus 1 monitors the PDCCH including the RA-RNTI during the period of a random access response window 903. The RA-RNTI may be decided based on the PRACH resource having been used for random access preamble transmission in Step S900.

The random access response transmitted in Step S902 includes: random access response grant field mapped in the uplink grant, a Temporary C-RNTI field where the Temporary Cell Radio Network Temporary Identifier (C-RNTI) is mapped; and a Timing Advance (TA) command. The terminal apparatus 1 adjusts the PUSCH transmission timing based on the TA command. The PUSCH transmission timing may be adjusted for each group of cells.

(Step S904) In a case where the received random access response includes a random access preamble identifier (index) corresponding to the transmitted random access preamble and where the terminal apparatus 1 itself selects a random access preamble randomly, the terminal apparatus 1 sets the Temporary C-RNTI to a value of the Temporary C-RNTI field, and transmits the random access message 3 (transport block) with the PUSCH based on the random access response grant included in the random access response. The random access message 3 is referred also to as the "message 3."

Step S906 describes a procedure of contention resolution. Once the base station apparatus 3 receives a message 3 from a particular terminal apparatus 1, the base station apparatus 3 transmits, to the particular terminal apparatus 1, an MAC PDU (contention resolution) (message 4) indicating that the particular terminal apparatus 1 has succeeded in the random access, that is, indicating that there is no random access preamble collision occurs between the particular terminal apparatus 1 and another terminal apparatus 1 or indicating that even though there is a random access preamble collision between the particular terminal apparatus 1 and another terminal apparatus 1, the particular terminal apparatus 1 overcomes the collision.

After transmitting the message 3, the terminal apparatus 1 receives a contention resolution during a Contention Resolution Timer 905. Based on the reception of the contention resolution, the terminal apparatus 1 considers that the contention based random access procedure is completed successfully.

Description will be given below about the configuration of the transmit power $P_{PRACH}$ for the PRACH (random access preamble) transmission.

The transmit power $P_{PRACH}$ for the PRACH (random access preamble) transmission is configured based at least on a state variable PREAMBLE_TRANSMISSION_COUNTER. The transmit power $P_{PRACH}$ for the PRACH (random access preamble) transmission is ramped up based on the state variable PREAMBLE_TRANSMISSION_COUNTER. The state variable PREAMBLE_TRANSMISSION_COUNTER is referred also to as a "preamble transmission counter." The transmit power $P_{PRACH}$ is obtained by Equation (1) and Equation (2).

$$P_{PRACH} = \min\{P_{CMAX,c}(i), \text{PREAMBLE\_RECEIVED\_TARGET\_POWER} + PL_c\} \text{ [dBm]} \quad \text{Equation (1)}$$

where $P_{CMAX,c}(i)$ is the configured UE transmit power for subframe i of serving cell c; and $PL_c$ is the downlink path loss estimate calculated in the UE for serving cell c.

$$\text{PREAMBLE\_RECEIVED\_TARGET\_POWER} = \text{preambleInitialReceivedTargetPower} + \text{DELTA\_PREAMBLE} + (\text{PREAMBLE\_TRANSMISSION\_COUNTER} - 1) * \text{powerRampingStep} \quad \text{Equation (2)}$$

where preambleInitialReceivedTargetPower and powerRampingStep are provided by the higher layer (RRC layer); and DELTA_PREAMBLE is the random access preamble format based power offset value.

The min { } is a function that outputs the minimum value from a plurality of input values. $P_{CMAX,c}(i)$ is the maximum value of transmit power for the subframe i of the Serving cell c. The maximum value of transmit power is referred also to as a configured UE transmit power. $PL_c$ is a downlink path loss prediction for the Serving cell c. The downlink path loss prediction is calculated by the terminal apparatus 1.

DELTA_PREAMBLE is a power offset value based on the random access preamble format. The preambleInitialReceivedTargetPower and the powerRampingStep is parameters of the higher layer (RRC layer). The base station apparatus 3 may transmit information indicating a parameter of the higher layer (RRC layer) to the terminal apparatus 1. The preambleInitialReceivedTargetPower represents the initial transmit power for the PRACH (random access preamble) transmission. The powerRampingStep indicates the transmit power step which is to be ramped up based on the preamble transmission counter PREAMBLE_TRANSMISSION_COUNTER. To put it differently, the preamble transmission counter is associated with the number of times when the transmit power is ramped up. In addition, by setting the preamble transmission counter to one, the ramping up of the transmit power is reset. In addition, by incrementing the preamble transmission counter by one, the ramping up of the transmit power is applied once.

As described earlier, in the LAA cell, an LBT procedure has to be performed for the subframe including the PRACH resource to be used for the random access preamble transmission before the random access preamble transmission (PRACH transmission) is performed. Note that in a case where the terminal apparatus 1 performs the LBT procedure and determines that the channel is busy, the terminal apparatus 1 transmits no random access preamble in the subframe. In this case, the preamble transmission counter PREAMBLE_TRANSMISSION_COUNTER holds the current value without any increment by one. To put it differently, the transmit power for PRACH transmission does not have to be ramped up. Note that even in a case where no random access preamble is transmitted, the preamble attempt counter is incremented by one. The preamble attempt counter will be described in detail later.

In a case where a subframe including the PRACH resource for the random access preamble transmission is configured as a downlink subframe by the DCI format 1C, the terminal apparatus 1 transmits no random access preamble in the subframe. Note that in a case where the 'Subframe configuration for LAA' field included in the DCI format 1C indicates, in the next subframe, the number of OFDM symbols to be used for the transmission of the downlink physical channel and/or physical signal, the terminal apparatus 1 may determine that the subframe is a downlink subframe. Note that the number of OFDM symbols to be used for the transmission of the downlink physical channel and/or physical signal is either one or more than one (i.e., is non-zero). Hence, in a case where the subframe including the PRACH resource to be used for the random access preamble transmission is a downlink subframe, no random access preamble transmission is performed in the downlink subframe. In this case, the preamble transmission counter PREAMBLE_TRANSMISSION_COUNTER holds the current value without any increment by one. To put it differently, the transmit power for PRACH transmission does not have to be ramped up. Note that even in a case where no random access preamble is transmitted, the preamble attempt counter is incremented by one. The preamble attempt counter will be described in detail later.

As described earlier, in the LAA cell, before transmission of the message 3 is performed, the LBT procedure has to be performed for the subframe to be used for the subframe to be used for the transmission of the message 3. Note that in a case where the terminal apparatus 1 performs the LBT procedure and determines that the channel is busy, the terminal apparatus 1 transmits no message 3 in the subframe. In this case, the preamble transmission counter PREAMBLE_TRANSMISSION_COUNTER holds the current value without any increment by one. To put it differently, the transmit power for PRACH transmission does not have to be ramped up. Note that even in a case where no message 3 is transmitted, the preamble attempt counter is incremented by one. The preamble attempt counter will be described in detail later.

In addition, the base station apparatus 3 may configure, for the terminal apparatus 1, the preamble attempt counter PREAMBLE_ATTEMP_COUNTER as a new parameter for the random access preamble transmission. The preamble attempt counter does not have to be associated with the number of times when the transmit power is ramped up. The preamble attempt counter may be incremented irrespective of whether or not random access preamble transmission actually occurs because of the above-mentioned causes in the subframe including the PRACH resource allocated for the random access preamble transmission. For example, in a case where the terminal apparatus 1 determines that a channel is idle in the LBT period, the terminal apparatus 1 may transmit the random access preamble in the subframe including the allocated PRACH resource and increment the preamble attempt counter by one. Alternatively, in a case where the terminal apparatus 1 determines that a channel is busy in the LBT period, the terminal apparatus 1 may increment the preamble attempt counter by one even through no random access preamble is transmitted in the subframe including the allocated PRACH resource. The initial value of the preamble attempt counter may be configured to one. Once the incremented value of the preamble attempt counter reaches a prescribed value (or a value equal to the prescribed value plus one), the terminal apparatus 1 may consider that the random access procedure has failed, or may consider that a random access problem has occurred and may notify the higher layer of the fact. The prescribed value may be decided based on the RRC parameter preambleTransMax received from the base station apparatus 3.

In a case (i) where no random access response is received during the period of the random access response window 903, or (ii) where the received random access response includes no random access preamble identifier (index) corresponding to the transmitted random access preamble, the terminal apparatus 1 may consider that the reception of the random access response has not been completed successfully, and may increment the preamble transmission counter and the preamble attempt counter by one.

In a case where the terminal apparatus 1 fails to receive the contention resolution during the period of a Contention Resolution Timer 905, the terminal apparatus 1 may consider that the contention resolution has not been completed successfully, and in addition, may increment the preamble transmission counter by one. Note that the case where the contention resolution is failed to be received during the Contention Resolution Timer 905 may be a case where the Contention Resolution Timer has expired.

Note that in a case where no PRACH transmission is performed based on the LBT procedure performed by the terminal apparatus 1 and the determination of the terminal apparatus 1 that the channel is busy, the preamble transmission counter does not have to be incremented by one. Even in a case where no PRACH transmission is performed based on the LBT procedure performed by the terminal apparatus 1 and the determination of the terminal apparatus 1 that the channel is busy, the preamble attempt counter is incremented by one.

In a case where the subframe to be used for the transmission of the message 3 is configured as downlink subframe by the DCI format 1C, the terminal apparatus 1 transmits no message 3 in the subframe. Note that in a case where the 'Subframe configuration for LAA' field included in the DCI format 1C indicates, in the next subframe, the number of OFDM symbols to be used for the transmission of the downlink physical channel and/or physical signal, the terminal apparatus 1 may determine that the subframe is a downlink subframe. Hence, in a case where the subframe to be allocated for the message 3 transmission is a downlink subframe, no message 3 transmission is performed in the downlink subframe. Note that the number of OFDM symbols to be used for the transmission of the downlink physical channel and/or physical signal is either one or more than one (i.e., is non-zero). In this case, the preamble transmission counter is not incremented by one, but is held as it is. To put it differently, the transmit power for PRACH transmission does not have to be ramped up. Note that even in a case where no message 3 is transmitted, the preamble attempt counter is incremented by one.

In a case where the 'Flag for triggered scheduling' field included in the received random access grant is set to one, the terminal apparatus 1 may detect (monitor, decode), during the period of the Validation duration v, based on the random access response grant included in the received random access response, DCI format 1C to which the CRC parity bits scrambled with the CC-RNTI are added. The Validation duration has a length v that is indicated by the third and fourth information bits of the 'Timing offset' field included in the random access response grant. In a case where during the period of the Validation duration v, the terminal apparatus 1 fails to detect any DCI format 1C to which the CRC parity bits scrambled with the CC-RNTI are added, the terminal apparatus 1 does not have to transmit a message 3. In this case, the preamble transmission counter is not incremented by one, but is held as it is. To put it differently, the transmit power for PRACH transmission does not have to be ramped up. Note that even in a case where no message 3 is transmitted, the preamble attempt counter is incremented by one.

Figure 10:
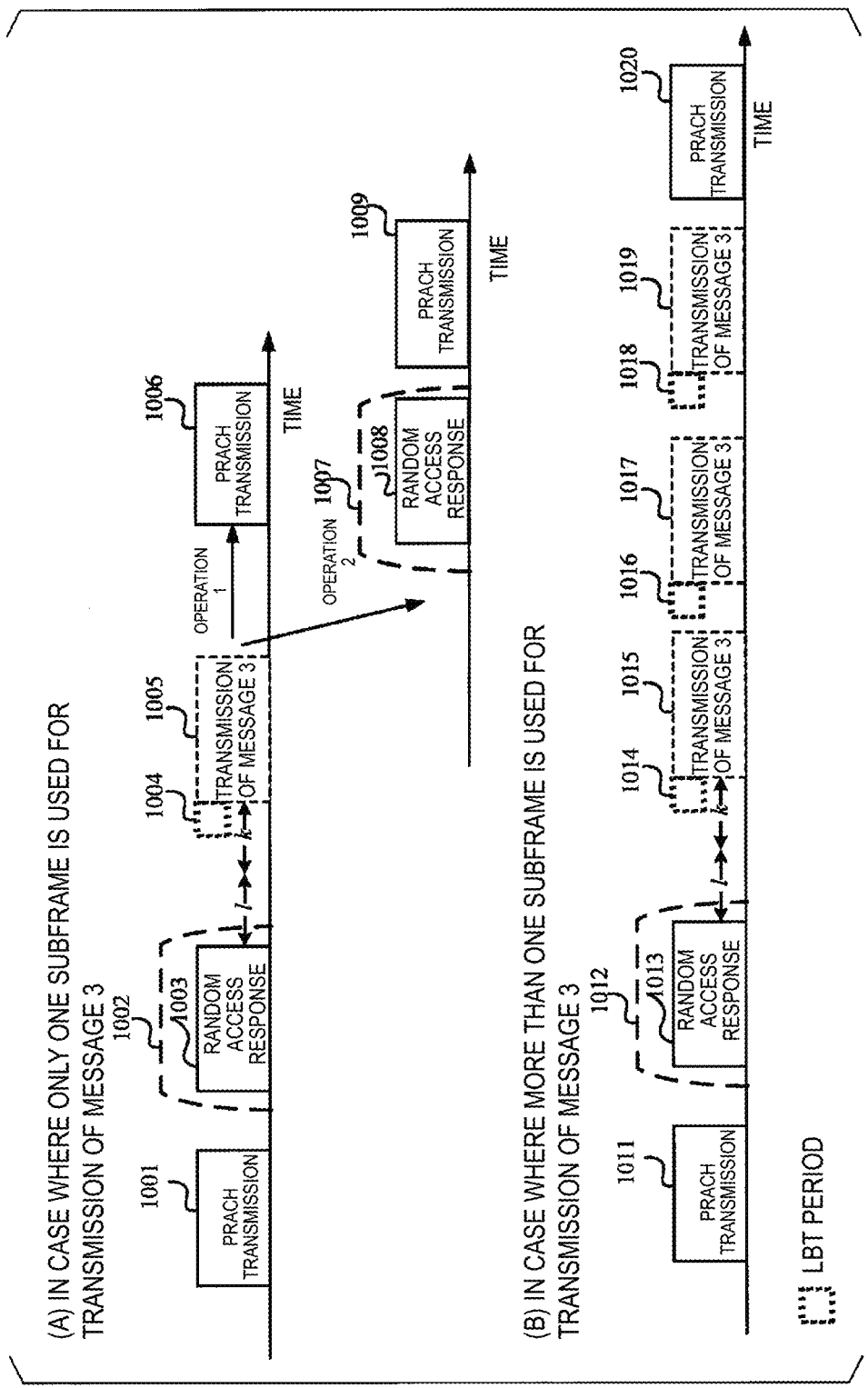
FIG. 10 is a diagram illustrating one example of transmission of a message 3 in the present embodiment.

FIG. 10 is a diagram illustrating one example of transmission of a message 3 in the present embodiment. In the example illustrated in FIG. 10, the 'Flag for triggered scheduling' field included in the random access response grant is set to zero. Alternatively, in the example illustrated in FIG. 10, the random access response grant includes no 'Flag for triggered scheduling' field.

The case of part (A) of FIG. 10 and the case of part (B) of FIG. 10 may be distinguished from each other based on the number of subframes allocated to the transmission of the message 3. To put it differently, either only one subframe or more than one subframe may be allocated to the transmission of the message 3.

In addition, in the LAA cell, two or more subframes allocated to the transmission of the message 3 may be consecutive ones. Alternatively, two or more subframes allocated to the transmission of the message 3 may be non-consecutive ones. The number of the allocated subframes and/or the values of the intervals between the allocated subframes may be indicated based at least on some or all of the following elements. The values of the intervals between the allocated subframes may be defined as the numbers of the subframes.

(i) Random access response grant
(ii) Parameter of RRC message/RRC layer
(iii) Prescribed configuration of specifications
(iv) System information (i) A new field is defined in the random access response grant. The field may indicate, to the terminal apparatus 1, the number of subframes to be allocated to the transmission of the message 3 and/or the values of the intervals between the allocated subframes.

The random access response grant may include a 'number of scheduled subframes' field. To put it differently, the number of the subframes to be allocated to the transmission of the message 3 may be decided based on the 'number of scheduled subframes' field. In addition, the random access response grant has a similar format to the DCI format 0B/4B.

(ii) The base station apparatus 3 may notify the terminal apparatus 1, by means of the RRC message, of the number of subframes to be allocated to the transmission of the message 3 and/or the values of the intervals between the allocated subframes.

(iii) The number of subframes to be allocated to the transmission of the message 3 and/or the values of the intervals between the allocated subframes may be the number and/or the values defined by the specifications or the like and thus known to both the base station apparatus 3 and the terminal apparatus 1.

(iv) The number of subframes to be allocated to the transmission of the message 3 and/or the values of the intervals between the allocated subframes may be notified of to the terminal apparatus 1 as a part of the LAA cell random access procedure information by the system information (System Information Block (SIB)).

Alternatively, the terminal apparatus 1 may determine, based on the combination of different elements, the number of subframes to be allocated to the transmission of the message 3 and/or the values of the intervals between the allocated subframes. For example, the random access response grant may schedule the first subframe to be used for the transmission of the message 3. The number of the other subframes to be allocated to the transmission of the message 3 and/or the values of the intervals between the allocated subframes may be notified of by means of the RRC message from the base station apparatus 3. Alternatively, for example, the base station apparatus may notify the terminal apparatus 1 of only the values of the intervals between the subframes. Then, the terminal apparatus 1 may determine, based on the first subframe and the values of the intervals between the subframes, the subframes to be used for the transmission of the message 3 in a manner like the semi-persistent-scheduling.

In the example illustrated in part (A) of FIG. 10, one subframe to be used for the transmission of the message 3 is allocated. The terminal apparatus 1 transmits a random access preamble on the PRACH 1001. The terminal apparatus 1 receives a random access response 1003 in a random access response window 1002. Based on the random access response grant included in the received random access response 1003, the terminal apparatus 1 determines the transmission timing (subframe 1005) and the frequency resource to be used for the transmission of the message 3. Then, in the determined subframe 1005, the transmission of the message 3 is performed. In a case where in an LBT period 1004, the terminal apparatus 1 performs the LBT procedure and determines that the channel is busy, the terminal apparatus 1 transmits no message 3 in the subframe 1005. In a case where in an LBT period 1004, the terminal apparatus 1 performs the LBT procedure and determines that the channel is idle, the terminal apparatus 1 transmits the message 3 in the subframe 1005.

In a case where the subframe to be used for the transmission of the message 3 is configured as downlink subframe by the DCI format 1C, the terminal apparatus 1 transmits no message 3 in the subframe. Note that in a case where the 'Subframe configuration for LAA' field included in the DCI format 1C indicates, in the next subframe, the number of OFDM symbols to be used for the transmission of the downlink physical channel and/or physical signal, the terminal apparatus 1 may determine that the subframe is a downlink subframe. Hence, in a case where the subframe to be allocated for the message 3 transmission is a downlink subframe, no message 3 transmission is performed in the downlink subframe. Note that the number of OFDM symbols to be used for the transmission of the downlink physical channel and/or physical signal is either one or more than one (i.e., is non-zero).

In a case where the 'Flag for triggered scheduling' field included in the received random access grant is set to one, the terminal apparatus 1 may detect (monitor, decode), during the period of the Validation duration v, based on the random access response grant included in the received random access response, DCI format 1C to which the CRC parity bits scrambled with the CC-RNTI are added. The Validation duration has a length v that is indicated by the third and fourth information bits of the 'Timing offset' field included in the random access response grant. In a case where during the period of the Validation duration v, the terminal apparatus 1 fails to detect any DCI format 1C to which the CRC parity bits scrambled with the CC-RNTI are added, the terminal apparatus 1 does not have to transmit a message 3.

In a case where the above-mentioned causes make the terminal apparatus 1 drop without transmitting the message 3 in the subframe allocated to the transmission for the message 3, the terminal apparatus 1 may flush, into the message 3 buffer (Msg3 buffer), the HARQ buffer to be used for the MAC PDU transmission.

In addition, in a case where the above-mentioned causes make the terminal apparatus 1 drop without transmitting the message 3 in the subframe allocated to the transmission for the message 3, the physical layer of the terminal apparatus 1 may notify the higher layer of a power ramping suspension indicator. In a case where the higher layer receives, from the physical layer, the notification of the power ramping suspension, the preamble transmission counter that corresponds to the number of times when the transmission power is ramped up does not have to be incremented by one. In addition, in a case where the preamble attempt counter is configured, the preamble attempt counter may be incremented by one irrespective of whether or not the higher layer has received, from the physical layer, the notification of the power ramping suspension. To put it differently, in a case where the preamble attempt counter is configured and in addition, where the higher layer has received, from the physical layer, the notification of the power ramping suspension, the preamble attempt counter may be incremented by one. In addition, in a case where the preamble attempt counter is configured and in addition, where the higher layer has received, from the physical layer, the notification of the power ramping suspension, the preamble attempt counter may be incremented by one.

During the period of the random access response window 903, in a case (i) where no random access response is received, or (ii) where the received random access response includes no random access preamble identifier (index) corresponding to the transmitted random access preamble, and in addition in a case where the higher layer has received no notification of the power ramping suspension from the physical layer, the terminal apparatus 1 may increment the preamble transmission counter by one. In addition, the preamble attempt counter may be incremented by one.

During the period of the random access response window 903, in a case (i) where no random access response is received, or (ii) where the received random access response includes no random access preamble identifier (index) corresponding to the transmitted random access preamble, and in addition in a case where the higher layer has received the notification of the power ramping suspension from the physical layer, the terminal apparatus 1 does not have to increment the preamble transmission counter by one. In addition, the preamble attempt counter may be incremented by one.

In a case where the terminal apparatus 1 fails to receive the contention resolution during the period of a Contention Resolution Timer 905, the terminal apparatus 1 may increment the preamble transmission counter by one unless the higher layer has received the notification of the power ramping suspension from the physical layer. In addition, the preamble attempt counter may be incremented by one.

In a case where the terminal apparatus 1 fails to receive the contention resolution during the period of a Contention Resolution Timer 905, the terminal apparatus 1 does not have to increment the preamble transmission counter by one as long as the higher layer has received the notification of the power ramping suspension from the physical layer. In addition, the preamble attempt counter may be incremented by one.

Then, in a case where the terminal apparatus 1 receives no message 3 in the subframe 1005 (or the reception of the random access response grant has not been completed successfully), an operation 1 or an operation 2 may be performed. Which of the operation 1 and the operation 2 is to be performed by the terminal apparatus 1 may be configured in advance from the base station apparatus 3.

The operation 1 is an operation where the transmission of the random access preamble is automatically performed by use of the PRACH (or where after returning to the selection of the random access resource or performing the selection of the random access resource, the random access preamble transmission is performed again by use of the PRACH). The terminal apparatus 1 automatically resumes the random access preamble transmission on the PRACH 1006.

In the operation 2, the terminal apparatus 1 may re-receive a new random access response during a prescribed period. To put it differently, in the case of part (A) of FIG. 10, the terminal apparatus 1 may re-receive a random access response 1008 in a prescribed period 1007. The prescribed period 1007 may be defined in terms of the number of subframes. The length of the prescribed period may be a value that has been determined in advance in the specifications, the system information, or the like. In addition, the base station apparatus 3 may notify the terminal apparatus 1 of the value by means of an RRC signaling. Alternatively, the value may be indicated by a field included in the random access response grant.

The start position of the prescribed period 1007 may be one or more subframes that is later than the subframe 1005 used for the transmission of the message 3. The value may be a value that has been determined in advance in the specifications, the system information, or the like. In addition, the base station apparatus 3 may notify the terminal apparatus 1 of the value by means of an RRC signaling. Alternatively, the value may be indicated by a field included in the random access response grant. In addition, in a case where the terminal apparatus 1 has not received a new random access response 1008 during the prescribed period 1007, the operation 1 may be performed. The terminal apparatus 1 may automatically resume the random access preamble transmission on the PRACH (1009).

Next, description is provided about the transmission of the message 3 of a case where in the example illustrated in part (B) of FIG. 10, two or more subframes are allocated to the transmission of the message 3.

In the example illustrated in part (B) of FIG. 10, the terminal apparatus 1 may determine, based, for example, at least on the random access response grant included in a received random access response 1013, multiple subframes 1015, 1017, and 1019 to be used for the transmission of the message 3. The above-mentioned subframes 1015, 1017, and 1019 may be allocated consecutively. Alternatively, the subframes 1015, 1017, and 1019 may be allocated non-consecutively.

As described earlier, in the LAA cell, the terminal apparatus 1 has to perform the LBT procedure before performing the transmission of the message 3 in the allocated subframes. The way to determine the LBT procedure may be similar to the way to determine the LBT procedure of the example illustrated in FIG. 8. In a case where the terminal apparatus 1 determines, based on the LBT procedure, that a channel is idle in a particular subframe, the terminal apparatus 1 does not have to perform any LBT procedures in the consecutive subframes following the particular subframe. In a case where the terminal apparatus 1 determines, based on the LBT procedure, that a channel is idle in a particular subframe, the terminal apparatus 1 have to perform an LBT procedure in the non-consecutive subframes that come later than the particular subframe.

For example, in a case where in the example illustrated in part (B) of FIG. 10, the subframes 1015, 1017, and 1019 to be used for the transmission of the message 3 are allocated non-consecutively, the terminal apparatus 1 may perform an LBT procedure in each of the subframes 1015, 1017, and 1019 before performing the transmission of the message 3.

Next, a method for transmitting the message 3 in two or more subframes is described below specifically. The abovementioned two or more subframes may be allocated consecutively or non-consecutively.

In an exemplar case where the terminal apparatus 1 performs an LBT procedure in a particular allocated subframe and determines that a channel is idle, the terminal apparatus 1 transmits the message 3 in the particular subframe. Then, the terminal apparatus 1 does not have to transmit any message 3 in the allocated subframes after the subframe where the message 3 is transmitted. To put it differently, the terminal apparatus 1 transmits the message 3 once in the first subframe that is determined to have an idle channel. The terminal apparatus 1 does not have to transmit any message 3 in the other allocated subframes than the first one that is determined to have an idle channel.

In another exemplar case, the terminal apparatus 1 may transmit the message 3 multiple times in all the subframes each of which is determined to have an idle channel. A possible transmission method may be one where the terminal apparatus 1 transmits, in a duplicated manner, the message 3 (initial transmission) in the subframes allowing the transmission. Alternatively, the terminal apparatus 1 may perform, in the subframes allowing the transmission, the initial transmission of the message 3 and the non-adaptive re-transmission of the message 3 in an order of the Redundancy Version as in the case of the method of TTI bundling. The Redundancy Version is used for the encoding (rate matching) of the transport block to be transmitted on the PUSCH. The Redundancy Version may be incremented in an order starting from 0 to 2, then to 3, and then to 1. The non-adaptive re-transmission may be triggered without waiting for the feedback (uplink grant and HARQ feedback) for the previous transmission of the message 3. Note that, for example, the subframes 1015, 1017, and 1019 may be used for the transmission of the message 3 based on the LBT procedure. The terminal apparatus 1 performs the initial transmission of the message 3 (the one with the Redundancy Version of 0) in the first subframe 1015. Then, the terminal apparatus 1 performs re-transmission of the message 3 (the one with the Redundancy Version of 2) in the subframe 1017. Then, the terminal apparatus 1 performs re-transmission of the message 3 (the one with the Redundancy Version of 3) in the subframe 1019.

In a case where terminal apparatus 1 determines that the channel is busy in every subframe allocated for the transmission of the message 3, the terminal apparatus 1 may drop without transmitting the message 3. In a case where the terminal apparatus 1 drops the transmission of the message 3 in every subframe allocated for the transmission of the message 3, the terminal apparatus 1 may notify the higher layer of the power ramping suspension indicator. In addition, in a case where the terminal apparatus 1 drops the transmission of the message 3 in every subframe allocated for the transmission of the message 3, the terminal apparatus 1 may flush, into the message 3 buffer (Msg3 buffer), the HARQ buffer to be used for the MAC PDU transmission. In addition, in a case where the terminal apparatus 1 drops the transmission of the message 3 in every subframe allocated for the transmission of the message 3, the terminal apparatus 1 may perform the operation 1 and automatically resume the random access preamble transmission by use of the PRACH. To put it differently, in a case where in the example illustrated in part (B) of FIG. 10, no transmission of the message 3 is performed in the subframes 1015, 1017, and 1019 based on the LBT procedure, the terminal apparatus 1 may resume the random access preamble transmission by use of a PRACH 1020. In addition, in a case where in the example illustrated in part (B) of FIG. 10, no transmission of the message 3 is performed in the subframes 1015, 1017, and 1019 based on the LBT procedure, the terminal apparatus 1 may switch to the operation 2 as illustrated in part (A) of FIG. 10.

In the contention based random access procedure, a new message 3 attempt counter (Msg3_attempt_counter) may be configured for the transmission of the message 3. The initial value of the message 3 attempt counter may be configured to one or zero. The message 3 attempt counter may be counted up for every message 3 attempt and incremented by one irrespective of the LBT procedure.

To put it differently, the message 3 attempt counter may be incremented in the subframes allocated for the transmission of the message 3 irrespective of whether or not the transmission of the message 3 actually occurs. For example, in a case where the terminal apparatus 1 determines that a channel is idle in the LBT period, the terminal apparatus 1 may transmit the message 3 in the allocated subframe and may increment the message 3 attempt counter by one. Alternatively, in a case where the terminal apparatus 1 determines that a channel is busy in the LBT period, the terminal apparatus 1 may increment the message 3 attempt counter by one in the allocated subframe even without transmitting the message 3.

Once the incremented message 3 attempt counter reaches a prescribed value (or a value equal to the prescribed value plus one), the terminal apparatus 1 may flush, into the message 3 buffer (Msg3 buffer), the HARQ buffer to be used for the MAC PDU transmission. In addition, once the incremented message 3 attempt counter reaches a prescribed value (or a value equal to the prescribed value plus one), the terminal apparatus 1 may notify the higher layer of the power ramping suspension indicator. In addition, once the incremented message 3 attempt counter reaches a prescribed value (or a value equal to the prescribed value plus one), the terminal apparatus 1 considers that the random access has failed, and resumes the random access preamble transmission by use of the PRACH. In this case, the initial value of the message 3 attempt counter may be re-configured to its initial value of one.

Once the incremented value of the message 3 attempt counter reaches a prescribed value (or a value equal to the prescribed value plus one), the terminal apparatus 1 may consider that a random access problem has occurred and may notify the higher layer of the fact. The prescribed value may be decided based on the RRC parameter received from the base station apparatus 3.

Figure 11:
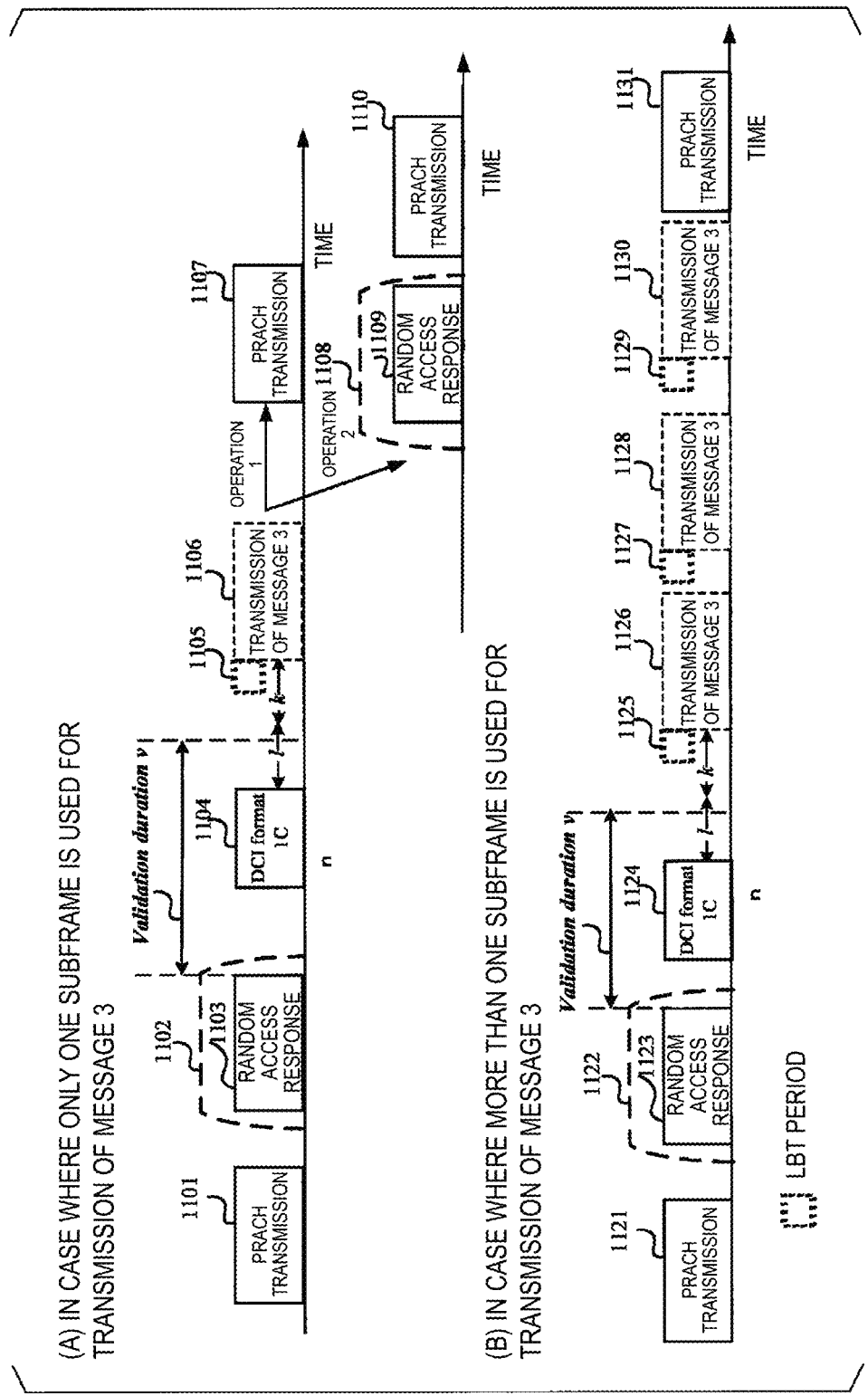
FIG. 11 is a diagram illustrating another example of transmission of a message 3 in the present embodiment.

FIG. 11 is a diagram illustrating another example of transmission of a message 3 in the present embodiment. In the example illustrated in FIG. 11, the 'Flag for triggered scheduling' field included in the random access response grant is set to one.

In the example illustrated in FIG. 11, the LBT procedure for the transmission of the message 3 may be determined in a similar manner to the LBT procedure for the PUSCH transmission in the example illustrated in FIG. 8.

The case of part (A) of FIG. 11 and the case of part (B) of FIG. 11 may be distinguished from each other based on the number of subframes allocated to the transmission of the message 3. In a case where the number of subframes allocated for to the transmission of the message 3 is one, the sequence illustrated in part (A) of FIG. 11 is applied. In a case where the number of subframes allocated for to the transmission of the message 3 is greater than one, the sequence illustrated in part (B) of FIG. 11 is applied.

In part (A) of FIG. 11, the terminal apparatus 1 performs random access preamble transmission on the PRACH (1101). The terminal apparatus 1 receives a random access response 1103 in a random access response window 1102. During the period of the Validation duration v, the terminal apparatus 1 may detect (monitor, decode), based on the random access response grant included in the received random access response 1103, DCI format 1C 1104 to which the CRC parity bits scrambled with the CC-RNTI are added. The Validation duration has a length v that is indicated by the third and fourth information bits of the 'Timing offset' field included in the random access response grant.

Then, based on the random access response grant and the DCI format 1C included in the received random access response 1003, the terminal apparatus 1 determines the transmission timing (subframe 1106) and the frequency resource to be used for the transmission of the message 3. Then, in the determined subframe 1106, the transmission of the message 3 is performed. The terminal apparatus 1 may perform the LBT procedure in the LBT period 1105 before performing the transmission of the message 3. In a case where in a period 1105, the terminal apparatus 1 performs the LBT procedure and determines that the channel is busy, the terminal apparatus 1 transmits no message 3 in the subframe 1106. In a case where in the LBT period 1105, the terminal apparatus 1 performs the LBT procedure and determines that the channel is idle, the terminal apparatus 1 transmits the message 3 in the subframe 1106.

In a case where the terminal apparatus 1 transmits no message 3 in the subframe 1106, the terminal apparatus 1 may perform the operation 1 or the operation 2. Either the operation 1 or the operation 2 may be performed. Which of the operation 1 and the operation 2 is to be performed by the terminal apparatus 1 may be configured in advance from the base station apparatus 3. The operation 1 and the operation 2 mentioned above may be similar to their respective counterparts in the example illustrated in part (A) of FIG. 10.

Part (B) of FIG. 11 illustrates the message 3 transmission of a case where there are multiple subframes configured to be used for the message 3 transmission.

The method of transmitting the message 3 in the multiple subframes in this example is similar to the method of transmitting the message 3 in the example illustrated in part (B) of FIG. 10. Hence, no more description of the method will be provided below. To put it differently, the operations and the method of transmitting the message 3 of the example illustrated in FIG. 10 may be applied to the example illustrated in FIG. 11.

In addition, in the contention based random access procedure in the present embodiment, a new random access attempt counter may be configured. At least in a case where any of the following events occurs, the random access attempt counter may be incremented by one.

(i) In the random access response window, no random access response can be detected.

(ii) In the subframe allocated for the transmission of the message 3, no message 3 can be transmitted.

(iii) In the contention resolution timer period, no contention resolution can be detected.

The initial value of the random access attempt counter may be configured to one. In a case where after the increment of the random access attempt counter, the value of the attempt counter reaches a prescribed value, the terminal apparatus 1 considers that the random access procedure has failed or the terminal apparatus 1 indicates that the random access problem to the higher layer (RRC layer) of the terminal apparatus 1. The higher layer (RRC layer) of the terminal apparatus 1 may notify the higher layer (RRC layer) of the base station apparatus 3 that a random access problem has occurred. The prescribed value may be decided based on the RRC parameter received from the base station apparatus 3.

Hereinafter, various aspects of the terminal apparatus 1 and the base station apparatus 3 according to the present embodiment will be described.

(1) A first aspect of the present embodiment provides a terminal apparatus 1 including: a channel measurement unit 208 configured to perform an uplink LBT procedure; and a transmission processing unit 209 configured to transmit a message 3 in an LAA cell. In the terminal apparatus 1, one or more subframes are allocated for transmission of the message 3. In addition, the transmission processing unit 209 starts an LBT procedure for transmission of a random access preamble in a case where it is determined that a channel is busy in all of the one or more subframes.

(2) In the first aspect of the present embodiment, of the one or more allocated subframes, in the first subframe that is determined to have an idle channel, the message 3 may be transmitted, and the message 3 does not have to be transmitted in any of the allocated subframe or other than the first subframe that is determined to have an idle channel.

(3) In the first aspect of the present embodiment, the subframe to be allocated for the transmission of the message 3 and/or an interval between the allocated subframes may be decided based at least on a part or all of the following elements: (i) a random access response grant; and (ii) an RRC message or a parameter of an RRC layer. In addition, the subframe to be allocated may include one or more subframes, and a value of the interval between the allocated subframes may be defined in terms of a number of subframes.

(4) In the first aspect of the present embodiment, in a case where two or more subframes are allocated for the transmission of the message 3, the two or more subframes may be either allocated consecutively or allocated non-consecutively.

(5) A second aspect of the present embodiment provides a base station apparatus 3 including: a radio resource control unit 1011 configured to allocate a subframe to be used for transmission of a message 3; and a reception processing unit 109 configured to receive the message 3 in an LAA cell. In the base station apparatus 3, one or more subframes are allocated for transmission of the message 3. In addition, the reception processing unit 109 receives a random access preamble transmission in a case where reception of the message 3 fails in all of the one or more subframes.

(6) In the second aspect of the present embodiment, in a case where the message 3 is received in a particular one of the allocated one or more subframes, the message 3 does not have to be received in any of the allocated subframe(s) after the particular subframe where the message 3 is received.

Hence, the terminal apparatus 1 can perform uplink transmission efficiently. In addition, the base station apparatus 3 can perform uplink transmission efficiently.

Each of a program running on a base station apparatus 3 and a terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these apparatuses is temporarily accumulated in a Random Access Memory (RAM) while being processed, and thereafter, the information is stored in various types of Read Only Memory (ROM) such as a flash ROM and a Hard Disk Drive (HDD), and read by the CPU to be modified or rewritten, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Preamble detection unit
105 Synchronization timing measurement unit
107 Control unit
108 Channel measurement unit
109 Reception processing unit
111 Transmission processing unit 1011 Radio resource control unit
1012 Random access control unit
1013 Receive antenna
1014 Transmit antenna
201 Higher layer processing unit
203 Control unit
205 Reception processing unit
207 Preamble generation unit
208 Channel measurement unit
209 Transmission processing unit
2011 Radio resource control unit
2012 Random access processing unit
2013 Receive antenna
2014 Transmit antenna

The invention claimed is:

1. A terminal device configured to communicate with a base station device using a cell of an unlicensed band, the terminal device comprising:
    channel measurement circuitry configured to perform an uplink channel access procedure;
    reception processing circuitry configured to receive, in a physical downlink shared channel, a message including a random access response grant for the cell of the unlicensed band; and
    transmission processing circuitry configured to transmit a physical uplink shared channel (PUSCH) scheduled by the random access response grant for the cell of the unlicensed band; wherein
    the random access response grant includes a field indicating at least an uplink channel access type for the PUSCH transmission;
    the channel measurement circuitry is configured to perform the uplink channel access procedure indicated by the field;
    a number of bits of the random access response grant is the same as a number of bits of a second random access response grant for a cell of a licensed band; and
    a number of bits of a first resource allocation field included in the random access response grant is smaller than a number of bits of a second resource allocation field included in the second random access response grant.

2. A base station device configured to communicate with a terminal device using a cell of an unlicensed band, the base station device comprising:
    channel measurement circuitry configured to perform an uplink channel access procedure;
    transmission processing circuitry configured to transmit, in a physical downlink shared channel, a message including a random access response grant for the cell of the unlicensed band; and
    reception processing circuitry configured to receive a physical uplink shared channel (PUSCH) scheduled by the random access response grant for the cell of the unlicensed band; wherein
    the random access response grant includes a field indicating at least an uplink channel access type for the PUSCH transmission;
    the channel measurement circuitry is configured to perform the uplink channel access procedure indicated by the field;
    a number of bits of the random access response grant is the same as a number of bits of a second random access response grant for a cell of a licensed band; and
    a number of bits of a first resource allocation field included in the random access response grant is smaller than a number of bits of a second resource allocation field included in the second random access response grant.

3. A communication method for a terminal device to communicate with a base station device using a cell of an unlicensed band, the communication method comprising:
    performing an uplink channel access procedure;
    receiving, in a physical downlink shared channel, a message including a random access response grant for the cell of the unlicensed band; and
    transmitting a physical uplink shared channel (PUSCH) scheduled by the random access response grant for the cell of the unlicensed band; wherein
    the random access response grant includes a field indicating at least an uplink channel access type for the PUSCH transmission;
    the channel measurement circuitry is configured to perform the uplink channel access procedure indicated by the field;
    a number of bits of the random access response grant is the same as a number of bits of a second random access response grant for a cell of a licensed band; and
    a number of bits of a first resource allocation field included in the random access response grant is smaller than a number of bits of a second resource allocation field included in the second random access response grant.

4. A communication method for a base station device to communicate with a terminal device using a cell of an unlicensed band, the communication method comprising:
    performing an uplink channel access procedure;
    transmitting, in a physical downlink shared channel, a message including a random access response grant for the cell of the unlicensed band; and
    receiving a physical uplink shared channel (PUSCH) scheduled by the random access response grant for the cell of the unlicensed band; wherein
    the random access response grant includes a field indicating at least an uplink channel access type for the PUSCH transmission;
    the channel measurement circuitry is configured to perform the uplink channel access procedure indicated by the field;
    a number of bits of the random access response grant is the same as a number of bits of a second random access response grant for a cell of a licensed band; and
    a number of bits of a first resource allocation field included in the random access response grant is smaller than a number of bits of a second resource allocation field included in the second random access response grant.

* * * * *